INVENTOR:
ANTONIE SNIJDERS.
BY Hugh A. Kirk
ATTY.

Dec. 6, 1960 A. SNIJDERS 2,963,548

REMOTELY CONTROLLED AUTOMATIC DISTORTION MEASURING SET FOR TELECOMMUNICATION NETWORK

Filed Dec. 19, 1955 24 Sheets-Sheet 2

INVENTOR:
ANTONIE SNIJDERS.
BY Hugh A. Kirk
ATTY.

INVENTOR:
ANTONIE SNIJDERS.
BY Hugh A Kirk
ATTY.

INVENTOR:
ANTONIE SNIJDERS
BY Hugh A. Kirk
ATTY.

INVENTOR:
ANTONIE SNIJDERS.
BY Hugh A. Kirk
ATTY.

INVENTOR:
ANTONIE SNIJDERS.
BY Hugh A. Kirk
ATTY.

INVENTOR:
ANTONIE SNIJDERS
BY Hugh A Kirk
ATTY.

| STATES | 4 VVA (r'') | 4 VVB (r''') | V4 or V9 | D5-25 | Z1-5 | | | | | Nº |
|---|---|---|---|---|---|---|---|---|---|---|
| 2 | r2-r3 | r5-r6 | | | | ● | | | | 1 |
| 2-3 | r3 | r5-r6 | | | ● | | ● | | ● | 2 |
| 3-7 | r3-r4 | r6 | V4 | | | | | | ● | 3 |
| 3-15 | r3-r4 | r5 | | | ● | | | ● | | 4 |
| 5 | r1-r2 | r6-r7 | V4 | | | ● | | | | 5 |
| 5-6 | r2 | r6-r7 | V9 | D10.4 | | | ● | | | 6 |
| 5-6 | r2 | r6-r7 | V9 | D20.9 | | | ● | | | 7 |
| 5-6-9-10 | r2 | r7 | V9 | D 5.4 | | | ● | | | 8 |
| 5-8 | r1 | r6-r7 | | | | | ● | | | 9 |
| 5-9 | r1-r2 | r7 | V9 | D15.9 | | | ● | | | 10 |
| 6-7 | r3 | r6-r7 | V4 | | ● | ● | | | | 11 |
| 6-7-10-11 | r3 | r7 | V9 | D10.9 | | | | ● | | 12 |
| 7 | r3-r4 | r6-r7 | V9 | D25.9 | | ● | ● | | | 13 |
| 7 | r3-r4 | r6-r7 | V9 | D15.9 D20.4 | | ● | ● | | | 14 |
| 7 | r3-r4 | r6-r7 | V9 | D 5.9 D10.4 | | ● | ● | | | 15 |
| 7-11 | r3-r4 | r7 | | | ● | | | ● | | 16 |
| 8 | r1-r4 | r6-r7 | V9 | | | | | ● | | 17 |
| 9 | r1-r2 | r7-r8 | V9 | D25.9 | ● | ● | | | | 18 |
| 9 | r1-r2 | r7-r8 | V4 | | | | | ● | | 19 |
| 9-10-11-12 | | r7-r8 | V9 | D 5.9 | | | | ● | | 20 |
| 10 | r2-r3 | r7-r8 | V9 | D10.9 D15.4 | | ● | ● | | | 21 |
| 10 | r2-r3 | r7-r8 | V9 | D20.9 D25.4 | | ● | ● | | | 22 |
| 10-11 | r3 | r7-r8 | V9 | D 5.4 | | ● | | | | 23 |
| 10-14 | r2-r3 | r8 | V9 | | ● | | | ● | | 24 |
| 11-12 | r4 | r7-r8 | V9 | | ● | | | ● | | 25 |
| 11-15 | r3-r4 | r8 | | | | ● | | | ● | 26 |
| 12 | r1-r4 | r7-r8 | V4 | | | | ● | ● | ● | 27 |
| 13 | r1-r2 | r5-r8 | V9 | | | ● | | | | 28 |
| 13 | r1-r2 | r5-r8 | V4 | | | ● | | ● | ● | 29 |
| 14 | r2-r3 | r5-r8 | V4 | | | ● | ● | | ● | 30 |

INVENTOR:
ANTONIE SNIJDERS.
BY Hugh A Kirk
ATTY.

INVENTOR:
ANTONIE SNIJDERS.
BY Hugh A Kirk
ATTY.

INVENTOR:
ANTONIE SNIJDERS.
BY Hugh A. Kirk
ATTY.

Dec. 6, 1960 A. SNIJDERS 2,963,548

REMOTELY CONTROLLED AUTOMATIC DISTORTION MEASURING SET FOR TELECOMMUNICATION NETWORK

Filed Dec. 19, 1955 24 Sheets-Sheet 11

INVENTOR:
ANTONIE SNIJDERS.
BY
Hugh A. Kirk
ATTY.

Dec. 6, 1960 A. SNIJDERS 2,963,548

REMOTELY CONTROLLED AUTOMATIC DISTORTION MEASURING SET FOR TELECOMMUNICATION NETWORK

Filed Dec. 19, 1955 24 Sheets-Sheet 12

INVENTOR:
ANTONIE SNIJDERS.
BY
Hugh A. Kirk
ATTY.

INVENTOR:
ANTONIE SNIJDERS.
BY Hugh A. Kirk
ATTY.

INVENTOR:
ANTONIE SNIJDERS.
BY Hugh A. Kirk
ATTY.

INVENTOR:
ANTONIE SNIJDERS.
BY
Hugh A Kirk
ATTY.

INVENTOR:
ANTONIE SNIJDERS.
BY Hugh A. Kirk
ATTY.

Dec. 6, 1960 A. SNIJDERS 2,963,548

REMOTELY CONTROLLED AUTOMATIC DISTORTION MEASURING SET FOR TELECOMMUNICATION NETWORK

Filed Dec. 19, 1955 24 Sheets-Sheet 17

INVENTOR:
ANTONIE SNIJDERS.
BY Hugh A. Kirk
ATTY.

MARKING CIRCUITS

INVENTOR:
ANTONIE SNIJDERS.
BY Hugh A Kirk
ATTY.

INVENTOR:
ANTONIE SNIJDERS
BY Hugh A Kirk
ATTY.

INVENTOR:
ANTONIE SNIJDERS.
BY
Hugh A. Kirk
ATTY.

INVENTOR:
ANTONIE SNIJDERS.
BY Hugh A. Kirk
ATTY.

FIG. 23 TELEPRINTER-RECORDER CONTROL CIRCUITS

INVENTOR:
ANTONIE SNIJDERS.
BY Hugh A. Kirk
ATTY.

INVENTOR:
ANTONIE SNIJDERS.
BY Hugh A Kirk
ATTY

INVENTOR:
ANTONIE SNIJDERS.
BY Hugh A Kirk
ATTY.

2,963,548

REMOTELY CONTROLLED AUTOMATIC DISTORTION MEASURING SET FOR TELECOMMUNICATION NETWORK

Antonie Snijders, The Hague, Netherlands, assignor to De Staat der Nederlanden, Ten Deze Vertegenwoordigd Door de Directeur-Generaal der Posterijen, Telegrafie en Telefonie, The Hague, Netherlands Filed Dec. 19, 1955, Ser. No. 554,056

Claims priority, application Netherlands Dec. 30, 1954

21 Claims. (Cl. 178—69)

The invention relates to an automatic measuring set for determining at a distance the largest distortion of telegraph signals in a start-stop code transmitted by a subscriber's station. More particularly, it deals with a measuring set which is installed in an exchange and which is called by the subscriber, after which the distortion of the signals received from the subscriber's station is measured in the measuring set and recorded by means of a number of distortion measuring circuits responsive to different amounts of distortion and in which for this purpose different moments are indicated. These moments are derived from a time scale in the measuring set that is started by a received signal from an inquiring subscriber, and on reception of a second specific signal from that subscriber, the measuring set transmits the largest distortion figure it has recorded from that subscriber. By means of one measuring set of this kind connected to an automatic telegraph exchange, the said largest amount of distortion of any teleprinter connected via this telegraph exchange to the measuring set can be read from that teleprinter itself in the said manner. This should be considered of great importance, because by means of this centrally located measuring set, technically unskilled personnel can directly find out whether a teleprinter meets certain requirements as regards to distortion. Only in case the distortion figures read should be inadmissibly high is it necessary to call on technically skilled personnel.

Such a measuring set is known from the British Patent No. 498,373. This measuring set is composed of finely-tooled mechanical parts, of which particularly the parts ($SK_1$–$SK_4$) provided on behalf of the transmission must be specially manufactured for this measuring set, so that mass production cannot be used. Besides, the control is effected by means of relays, so that an immediately correct adjustment is not ensured. Also this known measuring set cannot discriminate when receiving a signal from the subscriber whether the subscriber's set is in the "letters" position or in the "figure" position, and it cannot report by transmitting its name.

It is observed that Wheeler and Frost (Post Office Electrical Engineers Journal 47 (1954), No. 1, p. 5–9) have described a measuring set for determining the distortion of telegraph signals, in which the value of the distortion is indicated by stating the limits between which it lies, use being made of circuits controlled by distributors forming a time scale. Moreover, this device counts the number of times the distortion lies between specified limits. This allows a more complete impression of the distortion than is possible with the installation according to the invention. This impression, however, can only be obtained at the spot where the measuring set is located. Because, as has been described above, the measuring set according to this invention needs only to satisfy the need of an indication whether a teleprinter meets certain requirements as regards to distortion-indication obtained, however, by means of an automatic remote measurement; a determination of the largest distortion will suffice, so that a distortion measuring circuit may not only be changed over if the distortion lies between two limits, but may be changed over if the distortion exceeds a certain ultimate value. As a result of this, the object sought can be achieved by a combination of distributors having in all a smaller number of tubes than is required in the arrangement according to Wheeler and Frost. Moreover, in contradistinction to the arrangement according to Wheeler and Frost, the impulses can be used directly, without storage, for the control of the distortion measuring circuits.

According to the invention, these disadvantages are avoided because the measuring set is so arranged: that (1) the time scale is formed by a generator and several distributors controlled by it; that (2) scanning devices and receiving circuits have been provided, the latter being memory circuits having at least two states of equilibrium, the former being adapted to pass the polarity of each intelligence element of a received signal by means of pulses supplied by the time scale to a separate receiving circuit, which, consequently, assumes a state corresponding to that polarity; and that (3) the distortion measuring circuits are memory circuits having at least two states of equilibrium and which respond to different distortion figures by means of a change-over from one state into another. The states of the said receiving circuits 2 further determine in their turn the states of some marking circuits, which are memory circuits having at least two states of equilibrium and which indicate by their states whether the measuring set must remain in the receiving condition or whether it must be switched over to the transmitting condition. This switch-over resulting from the start of the said time scale and of a transmitting distributor by the said marking switches. The states of the marking circuits also determine in the transmitting state whether in the successive states of the transmitting distributor, the transmitting circuits (which have at least two states of equilibrium) successively represent by their states the polarities of the intelligence elements of (*a*) the signals forming the name of the measuring set, or of (*b*) the signals mentioning the percentages between which lies the largest amount of distortion occurring in the received signals. These signals stored in the transmitting circuits are transmitted via an output circuit with the aid of the time scale, after which the transmitting distributor puts the measuring set in the receiving circuit again.

It is observed that from my copending U.S. patent application Serial No. 322,180 a regenerative repeater is known comprising a generator and one distributor controlled by it, scanning devices and receiving circuits, the latter being memory circuits having two states of equilibrium. The scanning devices pass, by means of impulses furnished by the distributor, the polarity of each intelligence element of a received signal to a separate receiving circuit, which in consequence assumes a state corresponding to that polarity. The received signals thus recorded are retransmitted with the aid of the distributor via an output circuit.

The transmission of (*a*) the name and of (*b*) the percentages between which lies the largest distortion, may be effected after the reception of the signal "Who ?" or "?," respectively, the transmitting circuits in that case being controlled by means of relay cells, which in their turn are controlled by the transmitting distributor, the marking circuits and the distortion measuring circuits.

The distortion measuring circuits may be controlled by means of relay cells also, which in their turn are controlled by pulses occurring during the transitions in the signals received and by output terminals of the time scale.

The above mentioned and other features and objects of this invention and the manner of attaining them will become more apparent and the invention itself will be best understood by reference to the following description of an embodiment of the invention taken in conjunction with the accompanying drawings, wherein.

Figure 1:
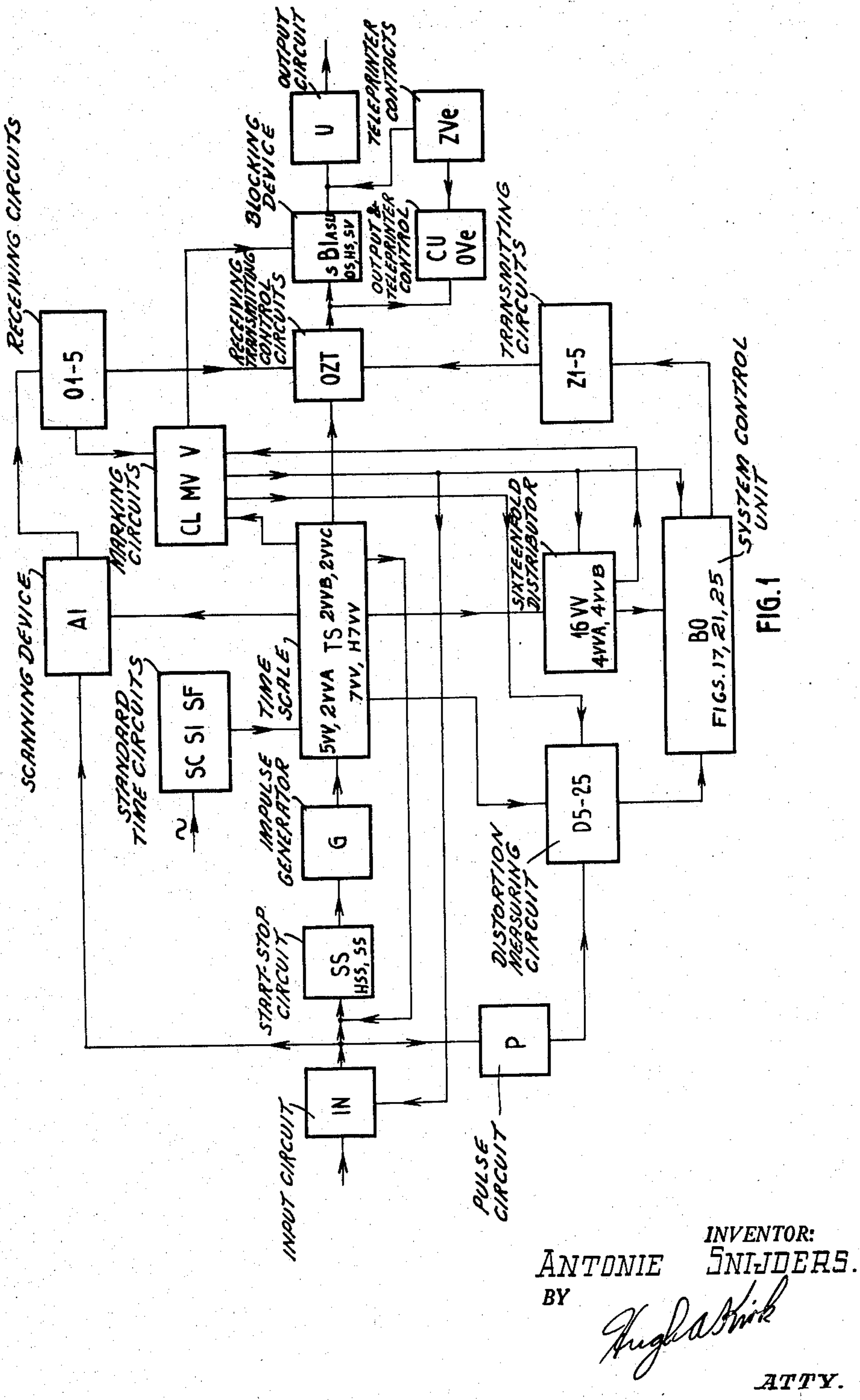
Fig. 1 is a schematic block diagram of the measuring set according to this invention located at an exchange of a telecommunication network.
Figure 9:
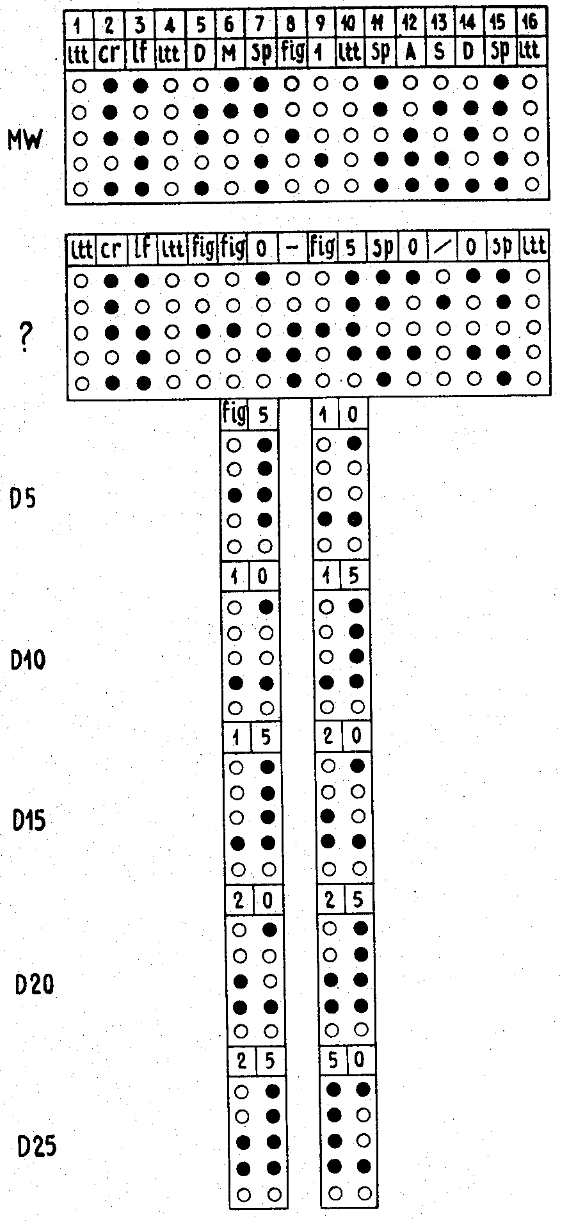
Figure 10:
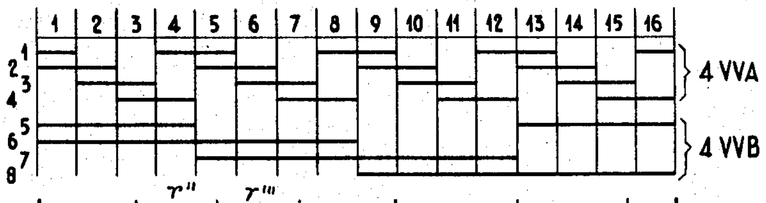
Figure 11:
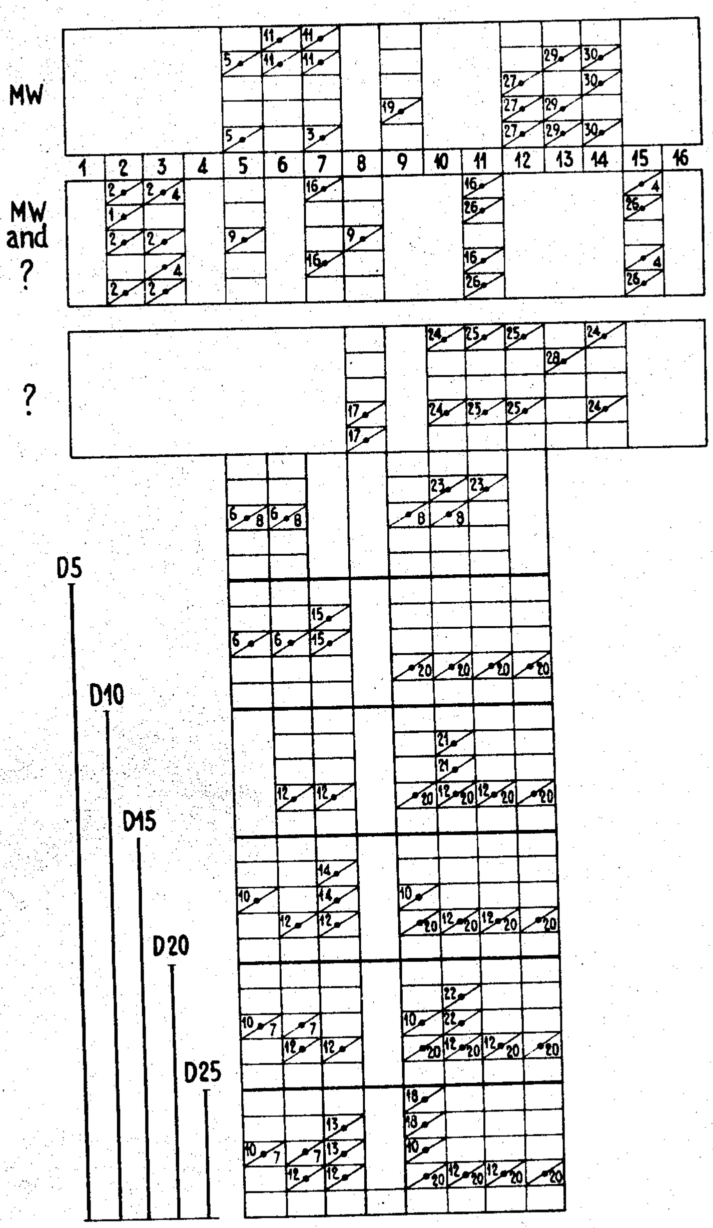
Figure 12:
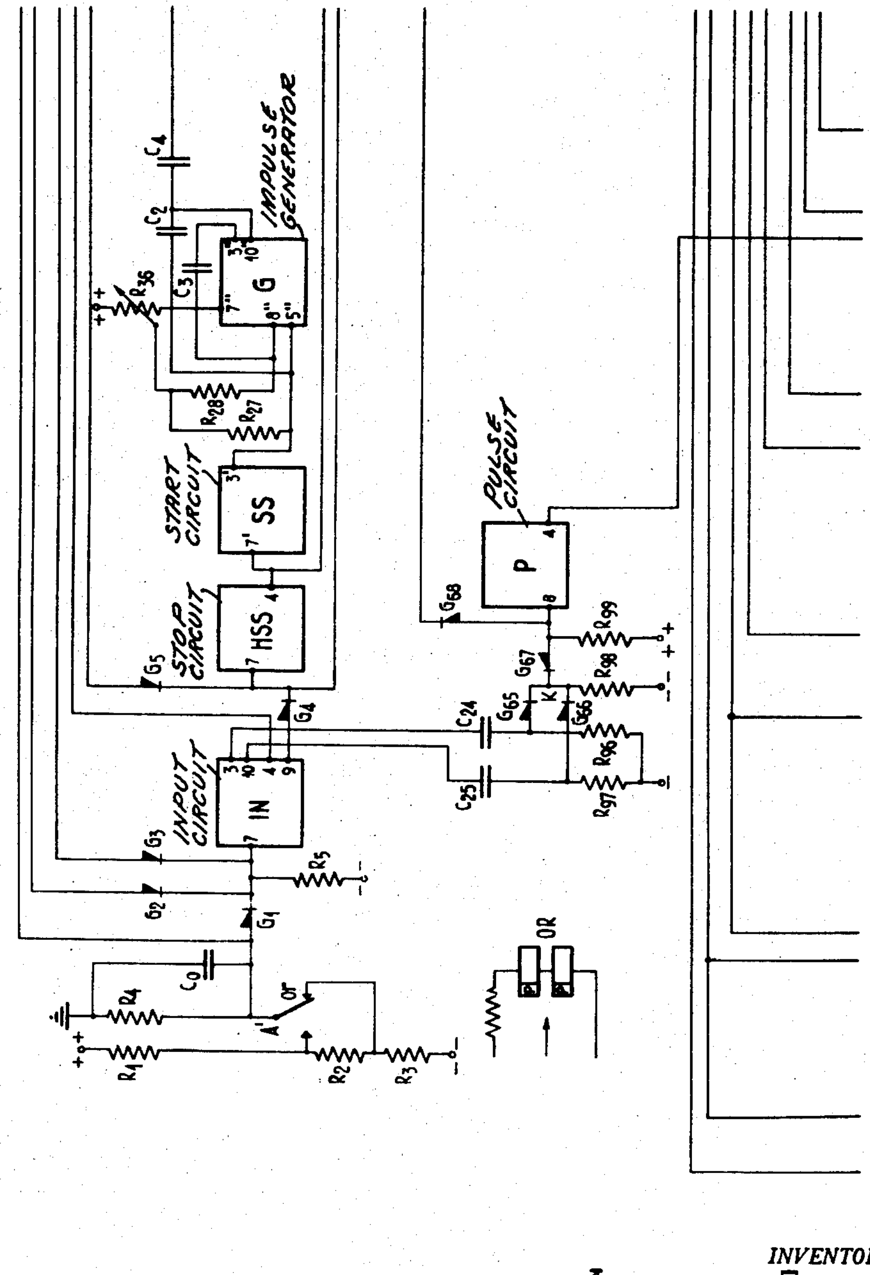
Figure 12A:
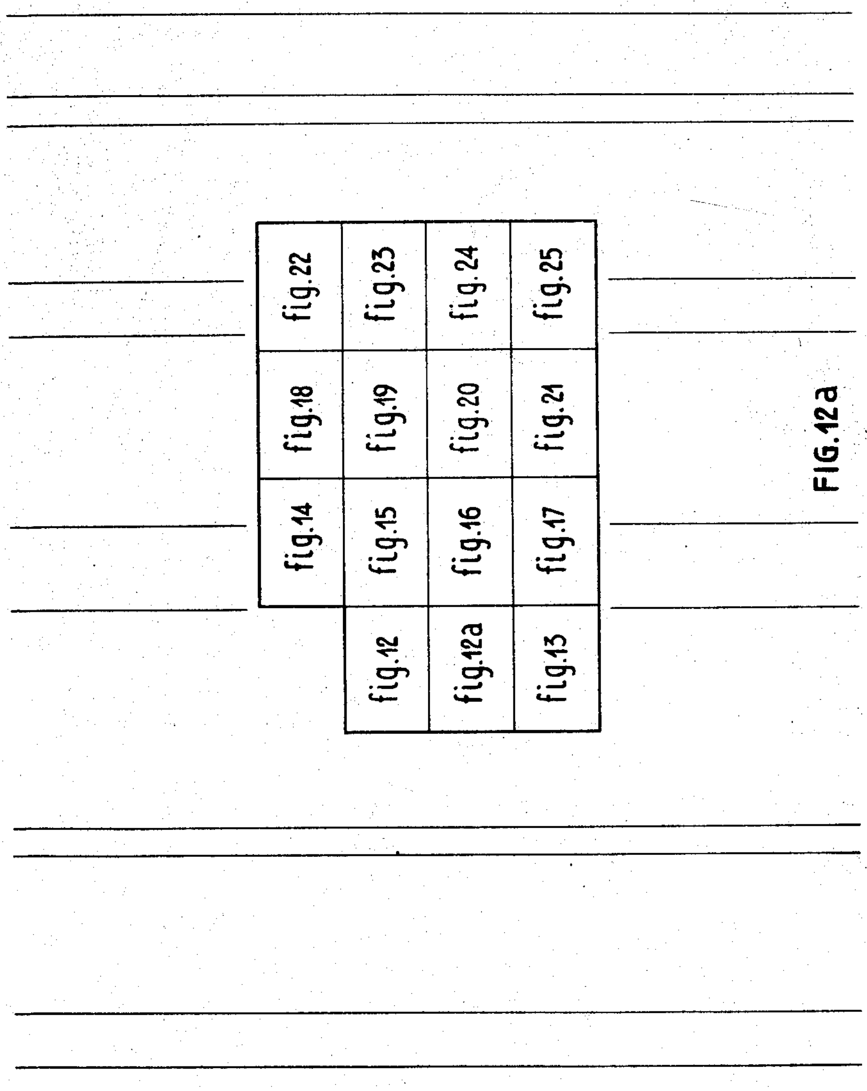

Figs. 9, 10 and 11 illustrate schematically how by means of circuits 16VV, V and D5 to D25, the desired states of the transmitting circuits are obtained, in order to automatically signal the amount of distortion measured; and Figs. 12 through 25 form a more detailed schematic wiring diagram of the whole measuring set of Fig. 1, with the circuits already mentioned above and shown separately in previous figures being represented by boxes, and the Fig. 12a shows how the Figs. 12 through 25 fit together.

In order to facilitate the following detailed description of the circuits and their operation according to the specific embodiment of this invention disclosed herein, the description will be divided into sections according to the following outline:

I. General operation
II. Starting circuits
  1. Input circuit (IN)
  2. Auxiliary start-stop circuit (HSS)
  3. Start-stop circuit (SS)
  4. Generator circuit (G)
III. Time scale circuits
  1. Five fold distributor (5VV)
  2. Two two-fold distributors (2VVA and 2VVC)
  3. A two-fold and a seven-fold distributor and auxiliary circuit (2VVB, 7VV, and H7VV)
  4. Standard time correction circuits (SC, SI and SF)
IV. Scanning and receiving circuits
  1. Scanning devices (AI)
  2. Receiving memory circuits (O1–5)
V. Distortion measuring circuits
  1. Pulse circuit (P)
  2. Distortion measuring memory circuits (D5–25)
VI. Transmission control circuits
  1. Marking circuits and their function (CL, MV, and V)
  2. Transmission signal distributor (16VV)
  3. Control unit (BO)
    a. Signals used and their function
    b. Function of control unit
VII. Transmitting circuits (Z1–5, OZT)
VIII. Output circuits (U, CU)
  1. Set teleprinter-recorder (ZVe, OVe)
IX. Specific control circuits
  1. Call and false rest condition circuits (OS, S, HS)
  2. Set answering circuits (HSV, SV)
  3. Clearing signal and set stopping circuits

I. *General operation*

The figures and the description relate to a measuring set by means of which the distortion of signals of a five units start-stop code tranmsitted at a speed of 50 bauds can be measured.

Without fundamental changes, however, measuring sets can be derived from these figures and description, for signals in a start-stop code having another number of intelligence elements and transmitted at another speed.

Figure 22:
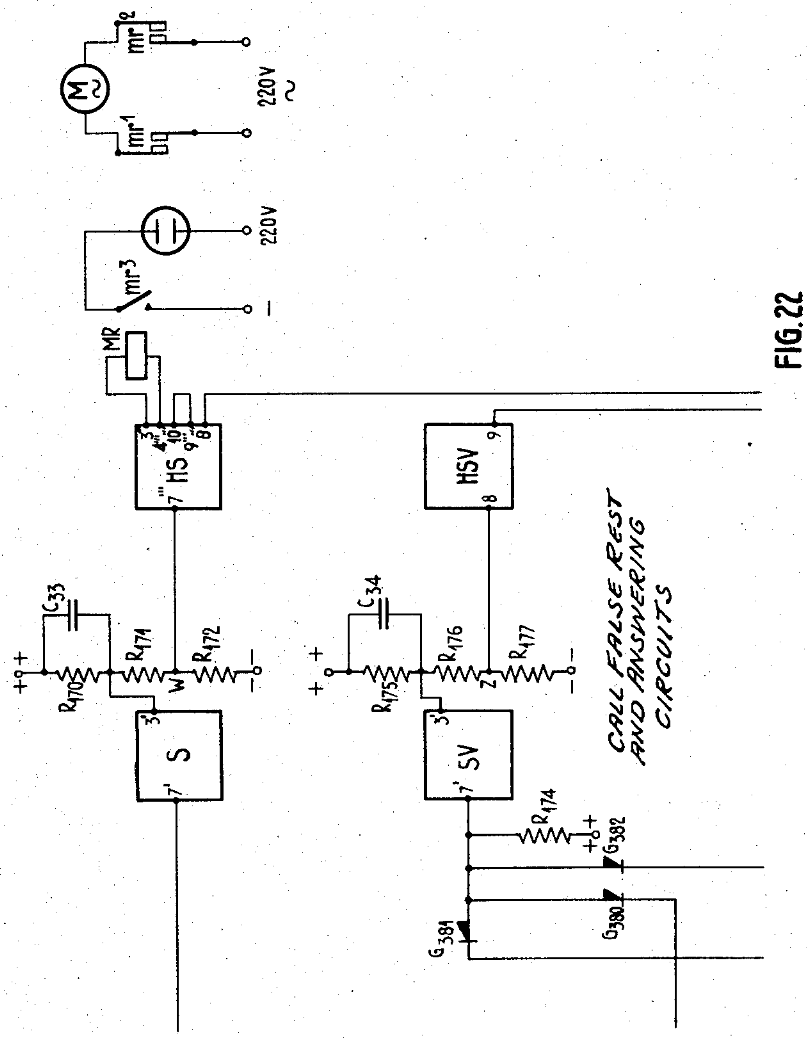

First of all the fundamental working of the measuring set will be described with reference to the block diagram of Fig. 1, which schematically shows a measuring set according to the invention comprising: an input circuit IN; a start-stop circuit SS which in Fig. 12 may also include an auxiliary start-stop circuit HSS; a generator G; a time scale circuit TS comprising according to Fig. 15 a five-fold distributor 5VV, three two-fold distributors 2VVA, 2VVB, and 2VVC, a seven-fold distributor 7VV and an auxiliary circuit H7VV; circuits SC, SI and SF for the control of the time scale TS; six receiving circuits O1 to O5 and associated scanning devices AI; a pulse circuit P; five distortion measuring circuits D5, D10, D15, D20 and D25; a sixteen-fold distributor 16VV comprising two four-fold distributors 4VVA and 4VVB shown in Fig. 16; a control unit BO; five transmitting circuits Z1 to Z5; marking circuits comprising a "figures/letters" circuit CL, a "Who ?/Question mark" circuit MV, and a "Question mark" circuit V; a circuit OZT which successively takes over the states of the receiving circuits or of the transmitting circuits, and according to Fig. 22 may also include a stop circuit S; an auxiliary stop circuit HS; a delayed stop circuit SV and an auxiliary delayed stop circuit HSV; a blocking device BI; an output circuit U; a control output circuit CU including teleprinter receiving coil OVe; and transmitting contacts ZVe.

The signals of which the distortion is to be determined arrive at the input circuit IN at the left of Fig. 1 or 12, after which three paths are open. On the first path the start element of each signal A (see Fig. 2) starts by means of the start-stop circuit SS a generator G for generating 1000 cycles per second shown as timing wave of pulses *g* (see Fig. 2), which in its turn starts the time scale TS consisting of several distributors. With respect to this time scale TS the distortion will be measured. Also, after the start element has been followed by elements of other polarities the generator G and the time scale TS continue to operate because by means of an output terminal of TS the start-stop circuit SS is kept in the correct state until the stop element of that signal has appeared.

On the second path the signal arrives at the scanning device AI, whence, with the aid of impulses from the time scale TS, the polarity of each intelligence element is passed to a separate one of the receiving circuits O1 to O5.

On the third path impulses derived from the transitions in the signal A issue from the pulse circuit P and influence, together with voltages appearing at output termins of the time scale TS, the states of the distortion measuring circuits D5 to D25. If as a result of the occurrence of a transition in the signal an impulse appears at a moment which according to the time scale is by more than 1 millisecond separated from the theoretically correct moment for the relevant transition, the distortion is larger than 5% since with a telegraphic speed of 50 bauds the duration of an element amounts to 20 milliseconds; and in that case the distortion measuring circuit D5 is changed over to another state. If the difference is larger than 2 ms., the distortion is larger than 10%; and in that case the distortion measuring circuit D10 is changed over, etc. Therefore the distortion measuring circuit D5 is responsive to impulses occurring 1 ms. before or after the theoretically correct moment, and distortion measuring circuit D10 operates if the said difference is larger than 2 ms., etc. The states of the distortion measuring circuits D5 to D25 indicate, whether the largest distortion lies between 0 and 5% (none of the distortion measuring circuits being changed over), between 5% and 10% (only distortion measuring circuit D5 being changed over), between 10% and 15% (distortion measuring circuits D5 and D10 being changed over), between 15% and 20% (distortion measuring circuits D5, D10 and D15 being changed over), between 20% and 25% (distortion measuring circuits D5, D10, D15 and D20 being changed over), or between 25% and 50% (all the distortion measuring circuits being changed over).

By means of the marking circuits CL, MV and V the nature of each received signal is examined, as soon as the polarities of the intelligence elements of this signal A have determined the states of the receiving circuits O1 to O5. The marking circuit CL is changed over as soon as the signal "figures" is received. If next the signal "Who ?" is received, marking circuit MV is changed over. If "?" is received, marking circuit MV as well as marking circuit V are changed over. In both cases the measuring set passes from the receiving condition into the transmitting condition.

In the former case ("Who ?") the calling teleprinter apparently wants the measuring set to answer by transmitting its name or identifying itself. In consequence of the change-over of the marking circuit MV the sixteen-fold distributor 16VV starts for one cycle, controlled by impulses from the time scale TS, which has meanwhile been started by MV. In consequence, at each position of distributor 16VV the control unit BO will cause the transmitting circuits Z1 to Z5 to assume the states corresponding to the polarities of the intelligence elements of a signal, in such a way that the successive signals together form the name of the measuring set.

In the latter case "?" the calling teleprinter subscriber apparently wants the measuring set to give the limits between which lies the largest distortion of the signals sent. In this case too the distributor 16VV will start for one cycle as a result of the change-over of the marking circuit MV. As the marking circuit V has also been changed over in this case, at each position of the distributor 16VV; the control unit BO will cause the transmitting circuits Z1 to Z5 to assume the states corresponding to the polarities of the intelligence elements of a signal, in such a way that the successive signals together indicate the limits asked. As soon as the distributor 16VV has finished its cycle, it restores the marking circuits to normal; the marking circuits, in their turn restore the distortion measuring circuits to normal. The measuring set is again in the receiving condition then.

As long as the measuring set is in the receiving condition, the circuit OZT successively takes over with the aid of the time scale TS the states of the receiving circuits O1 to O5, after which the same thing is done by the control output circuit CU. The received signal appears then at the receiving device OV*e* of the teleprinter associated with the measuring set. The blocking device BI prevents the output circuit U from also taking over the states of the receiving circuit O1 to O5 in this case.

If the measuring set is in the transmitting condition, the circuit OZT successively takes over, with the aid of the time scale TS, the states of the transmitting circuits Z1 to Z5, after which the same thing is done again by the control output coil of circuit CU. The signal to be transmitted then appears at the receiving teleprinter device OV*e*, but now the states of the circuit OZT are taken over by the output circuit U also, so that the signal is transmitted to the calling subscriber's teleprinter. If desired a person who may attend the measuring set can use the transmitting device ZV*e* of the teleprinter associated with the measuring set to send communications to the calling teleprinter.

Via the circuits SF, SC and SI (see Fig. 14) pulses derived from a standard frequency may be applied to the time scale TS to check the correctness of the time scale.

The provisions made in order to make the measuring set operate according to the regulations for calling and clearing signalling in an automatic telegraph system are described in connection with the detailed diagram (Figs. 12 to 25), some of the unit circuits of which are represented by boxes that are shown in detail in Figs. 3 to 8, and a time diagram of the working of the various parts shown in Fig. 2. In the drawings a number of practical details that are of no importance for the invention have been omitted.

II. *Starting circuits*

II–1. INPUT CIRCUIT IN

The signal of which the distortion is to be measured is received by way of example by means of a receiving relay OR (Fig. 12) which controls by means of its armature the input circuit of the measuring set. It is easily feasible to replace this relay by an electronic circuit. A voltage wave or curve at point A′ of the measuring set is shown on the first line of Fig. 2. This first line gives the curve throughout the reception of a signal consisting of a start element of negative (−) polarity, five intelligence elements of − or + polarity, and a stop element of positive (+) polarity. The undistorted transitions between the elements are indicated by dashed lines. If the signal is distorted, the transitions are shifted with respect to these dashed lines.

The aramature *or* of relay OR forms parts of a circuit comprising four resistors R1 to R4. Via point A′ of this circuit the measuring set is started for one receiving cycle by the start element of the incoming signal. The resistors R1 to R3 are connected in series and the ends of this series arrangement are connected to the positive (++) and to the negative (−−) pole, respectively, of a voltage source, which may supply of +150 v. and −70 v. The resistor R4 is connected at one end to point A′, and at the other end to ground. In parallel to it there is a capacitor C0, which serves to provide a clearly defined passage through zero for input terminal 7 of the input circuit IN.

The resistors R1 to R4 are so chosen that with the voltages mentioned and in the position of the armature *or* as indicated, the position held by the armature *or* in the false rest condition or if an element of − polarity is received, the potential of point A′ will be −10 v. In what follows this will also be called the − level, represented in the drawing by −. When the armature *or* is changed over to the alternative position, the potential of point A′ will be +10 v. In what follows this will be called the + level, represented in the drawing by +.

Point A′ is connected via rectifier G1 to terminal 7 of the input circuit IN. The rectifier G1 belongs, together with rectifiers G2 and G3, to a so-called relay cell according to my copending U.S. Patent application Serial No. 300,817. Via resistor R5 the common point of the said rectifiers are connected to the negative pole of the voltage source. Input terminal 7 of the input circuit IN, which is at the same time the output terminal of the relay cell, always passes the most positive of the voltages occurring at the output terminal 4 of the marking circuit MV in Fig. 19 via rectifier G3, the output terminal 9 of the receiving circuit OS in Fig. 18 via the rectifier G2, and the point A via the rectifier G1 to the control grid of an electron discharge tube B9 of the input circuit IN (see Fig. 3). As will be described later, in connection with the relevant circuits, terminal 4 of the marking circuit MV and terminal 9 of the receiving circuit OS have a negative potential, when signals are received, so that the potential of the point A will determine the potential of terminal 7 of the input circuit IN. On reception of the start element of a signal, terminal 7 will become negative.

For the input circuit IN use may be made of the standard circuit according to said copending U.S. Patent application Serial No. 300,817. This is shown in detail in Fig. 3, and Fig. 12 only shows the input and output terminals thereof which are used. This method is followed throughout the further description, input terminals being shown at the left, output terminals at the right of a box. From Fig. 3 it can be seen that input terminal 7 is connected via a resistor R6 to the control grid of an electron discharge tube B9. Input terminal 8 is connected directly to this grid. A tap on a high-ohmic potentiometer R7/R8, connected between the anode of this tube B9 and the negative pole of the voltage source (terminal 11) is, connected to the control grid of an electron discharge tube B10. The anode of the tube B9 is connected to an output terminal 10 and via resistor R16 to the positive pole of the voltage source (terminal 2). The anode of the tube B10 is connected to an output terminal 3 and via resistor R17 to the positive pole of the voltage source (terminal 2). The cathodes of the tubes B9 and B10 are connected via resistor R15 to the negative pole of the voltage source (terminal 11). The filament voltage for these tubes is applied between terminals 1 and 12. A tap on potentiometer R9/R10 connected between the anode of tube B9 and terminal 11 is connected to output terminal 9. In like manner a similar tap on a potentiometer R11/R12 connected between the anode of B10 and terminal 11 is connected to output terminal 4. A tap on a higher-ohmic potentiometer R13/R14 connected between the anode of B10 and terminal 11 is connected to output terminal 5.

When the terminal 7 becomes negative, the tube B9 becomes non-conductive. Via potentiometer R7/R8 the control grid of tube B10 becomes positive, so that this tube becomes conductive. The values of the resistors are such that the output terminal 9 assumes the + level in consequence; and the output terminal 4 assumes the minus level. In the case of a positive voltage applied to terminal 7 the voltages at the said terminals 9 and 4 would be exactly the reverse.

II-2. AUXILIARY START-STOP CIRCUIT HSS

Output terminal 9 (see Fig. 12) is connected via rectifier G4 to the input terminal 7 of the auxiliary start-stop circuit HSS. The rectifier G4, together with rectifiers G5, G6 and G7 belongs again to a relay cell (cf. Fig. 15). Via resistor R19 the common point of these rectifiers is connected to the negative pole of the voltage source. Input terminal 7 of the auxiliary start-stop circuit HSS, which is at the same time this second mentioned output terminal of the relay cell, always passes the most positive of the voltages occurring at the output terminal 4 of circuit SC in Fig. 14 via the rectifier G5, the point D via the rectifier G6, the output terminal 4 of circuit H7VV via the rectifier G7, and the output terminal 9 of the input circuit IN via rectifier G4. This most positive of these four voltages is passed to the control grid of the first tube of the auxiliary start-stop circuit HSS, which is identical to the input circuit IN, see Fig. 3.

As will be described later in connection with the relevant circuits, terminal 4 of the time scale control circuit SC and terminal 4 of the marking circuit MV have a negative potential when signals are received. In the rest condition terminal 4 of the auxiliary circuit H7VV is negative too. Terminal 9 of the auxiliary circuit H7VV is positive in that case the circuit (H7VV also being a circuit according to Fig. 3). The common point D of the relay cell consisting of rectifiers G6, G8 and G9, and a connection via resistor R18 to a positive potential, will nevertheless be negative, because it is connected via the rectifier G8 to terminal 4 of the marking circuit MV, which has a negative potential. In this case, as is easily seen, the common point D will assume a potential determined by the most negative of the voltages applied to the other ends of the rectifiers. Consequently, the voltage appearing at output terminal 9 of the input circuit IN will determine the voltage at point 7 of the auxiliary start-stop circuit HSS. On reception of a start element, this voltage will be positive, as has been mentioned already. It results from this; that the first tube of the auxiliary start-stop circuit HSS will become conductive, the second non-conductive. So output terminal 4 of the auxiliary start-stop circuit HSS now becomes positive. In consequence of this input terminal 7 of the start-stop circuit SS becomes positive too. This causes the start of generator G in a way as is described in my copending U.S. Patent application Serial No. 322,180.

II-3. START-STOP CIRCUIT SS

Figure 4:
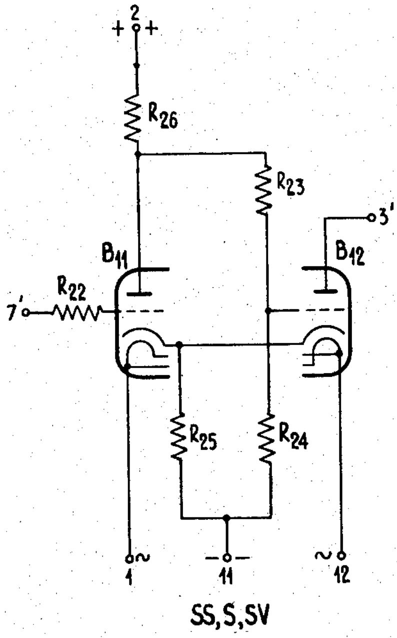
Fig. 4 is a wiring diagram of the circuit used for the parts SS, S and SV shown in Figs. 12 and 22.

The start-stop circuit SS is shown in detail in Fig. 4. It has two electron discharge tubes, B11 and B12. Input terminal 7′ is connected via resistor R22 to the control grid of the tube B11. The anode of this tube is connected via resistor R26 to the positive pole of the voltage source (terminal 2). Between this anode and the negative pole of the voltage source (terminal 11), a potentiometer R23/R24, has been provided of which a tap is connected to the control grid of tube B12. The cathodes of the two tubes are connected via a resistor R25 to terminal 11. The filament voltage for the tubes is again applied between terminals 1 and 12. In the rest condition the potential of point 7′ is negative so the tube B11 is non-conductive and the tube B12 conductive.

II-4. GENERATOR G

The anode of B12 is connected to the output terminal 3′ of the start-stop circuit SS and, consequently (see Fig. 12), to the connecting point of resistor R27 and capacitor C2 of generator G. The generator G may be a normal multivibrator working at a frequency of 1000 c./s. Resistor R27 and capacitor C2 form the frequency-determining element in one direction; resistor R28 and capacitor C3 that in the other direction. By means of an adjustable contact on resistor R36, via which the resistors R28 and R27 are connected to the positive pole of the voltage source, the frequency can further be adjusted.

Figure 5:
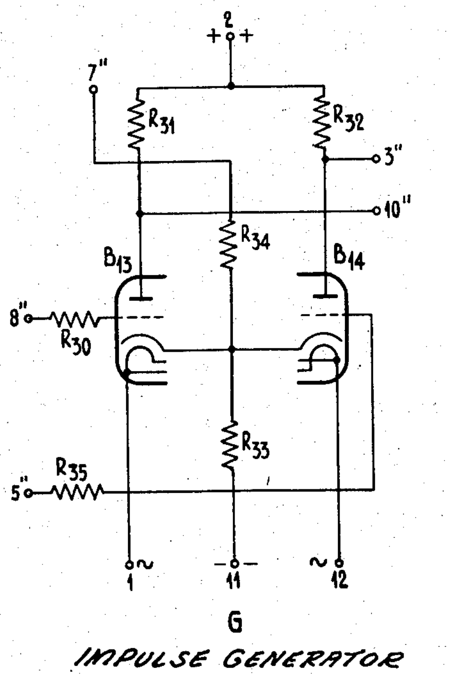
Fig. 5 is a wiring diagram of a part of the generator circuit G shown in Fig. 12.

The generator circuit G, as it is taught in the box of Fig. 12, is shown in detail in Fig. 5, from which it is seen that the circuit contains two electron discharge tubes, viz. B13 and B14. The anode of tube B13 is connected to output terminal 10″, and that of tube B14 to output terminal 3″. Moreover, the anode of the tube B13 is connected via resistor R31 and the anode of the tube B14 is connected via resistor R32 to the positive pole of the voltage source (terminal 2). The cathodes are connected via resistor R33 to the negative pole of the voltage source (terminal 11). The filament voltage is again applied between terminals 1 and 12. The cathodes are connected via resistor R34 to terminal 7″, which is also connected via the above-mentioned resistor (Fig. 12) R36 to the positive pole of the voltage source. Input terminals 8″ and 5″ are connected via resistors R30 and R35, respectively, to the control grids of tubes B13 and B14, respectively.

The tube B12 of the start-stop circuit SS receives its anode voltage via the resistors R27 and R36 (Fig. 12). If the tube B12 is conductive, the resistors being correctly chosen, the control grid of the tube B14 has the same negative potential with respect to the cathode which it has if, during the operation of the generator, B14 is non-conductive and the tube B13 is conductive; thus the capacitors C2 and C3 are charged to equal voltages. If now as a result of the reception of a start element, terminal 7′ of the start-stop circuit SS assumes a positive potential, the tube B11 becomes conductive and tube B12 non-conductive. Capacitor C2 begins to discharge via resistor R27 and the control grid potential of the tube B14 (input terminal 5″) rises. After ½ millisecond the tube B14 becomes conductive. The voltage drop in the anode lead is transmitted via capacitor C3 to the control grid of the tube B13, as a result of which this tube becomes non-conductive; the generator operates. The wave form of pulses of line *g* in Fig. 2 represents this operation such as the anode voltage of the tube B14 at its output terminal 3″.

To stop the generator G, tube B11 of the start-stop circuit SS must be put back in the non-conductive state by a decrease of the potential of terminal 7 of the start-stop circuit SS.

III. *Time scale circuits*

III–1. FIVE FOLD DISTRIBUTOR (5VV)

Figure 15:
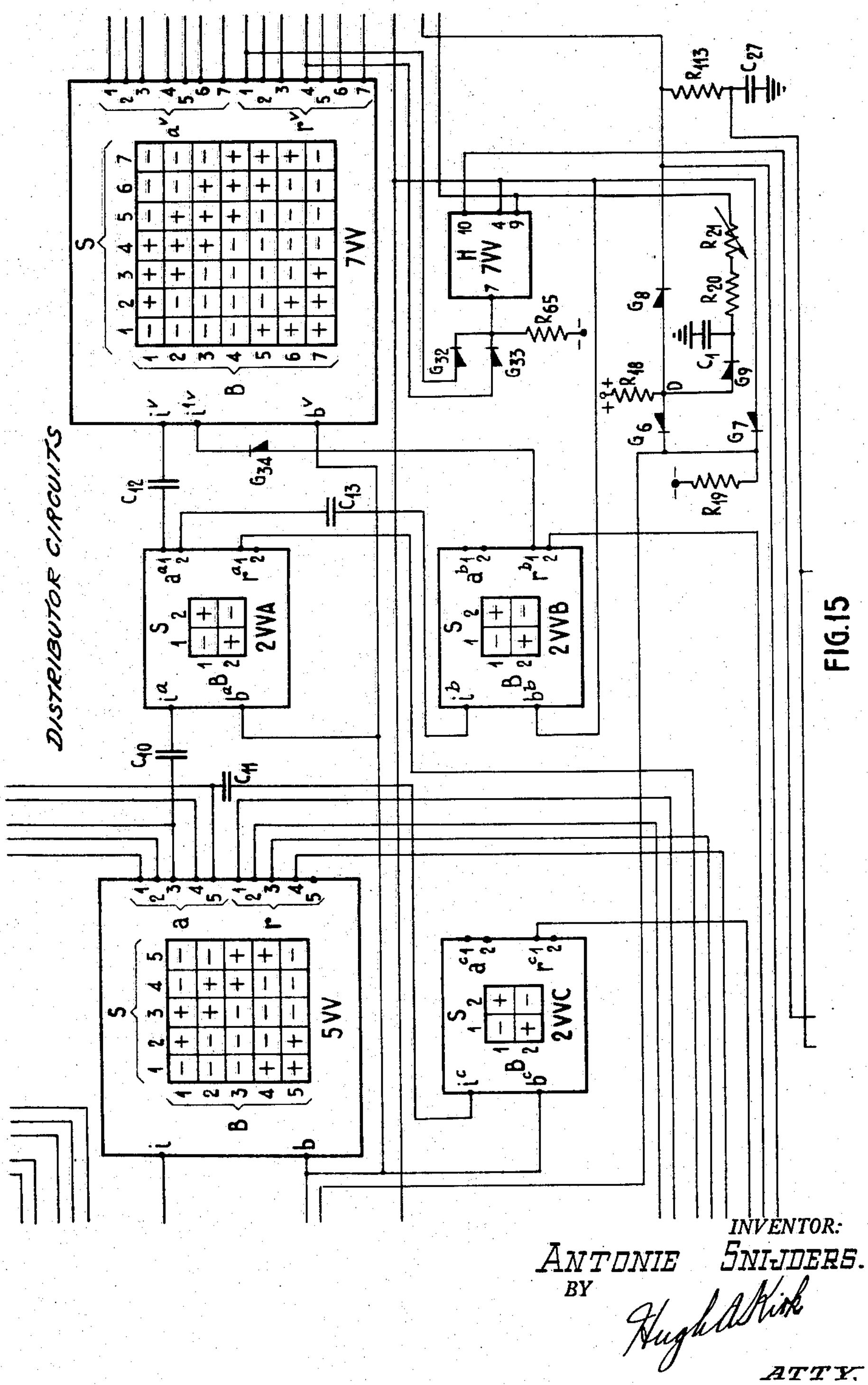

During operation of the generator G, it delivers at its output terminal 10″ via capacitor C4 (Fig. 12) positive and negative pulses to the input terminal (*i*) of a five-fold distributor 5VV (see Fig. 15). For this arrangement a type of distributor has been chosen in which in each state three successive tubes out of five are conducting. Such a distributor, in which, if it is more than twofold, in each state a plurality of tubes are conducting, has been described in my joint copending U.S. Patent application Serial No. 483,989. This distributor 5VV is shown as a box in Fig. 15, but a wiring diagram thereof is given in Fig. 7, the tube circuits BS of Fig. 6. As can be seen from Fig. 7, the distributor 5VV has six of such tube circuits, to wit an input tube circuit BS0 and five distributor tube circuits BS1 through BS5.

Figure 6:
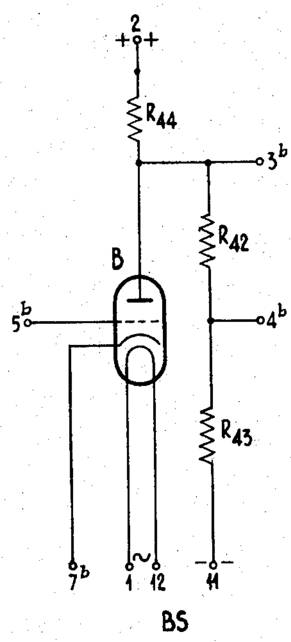
Fig. 6 is a wiring diagram of the tube circuit BS used as a part of the distributors shown in Fig. 7.

It results from Fig. 6, that such a tube circuit BS consists of a tube B of which the cathode is connected to terminal 7*b*, the grid to terminal 5*b* and the anode to terminal 3*b* and via a resistor R44 to the positive pole of the voltage source (terminal 2). The filament voltage is applied between terminals 1 and 12. Between the anode and the negative pole of the voltage source (terminal 11) a potentiometer R42/R43 has been provided of which the tap is connected to output terminal 4*b*. With a conductive tube B this terminal 4*b* will be at − level, with a non-conductive tube B at + level.

Figure 7:
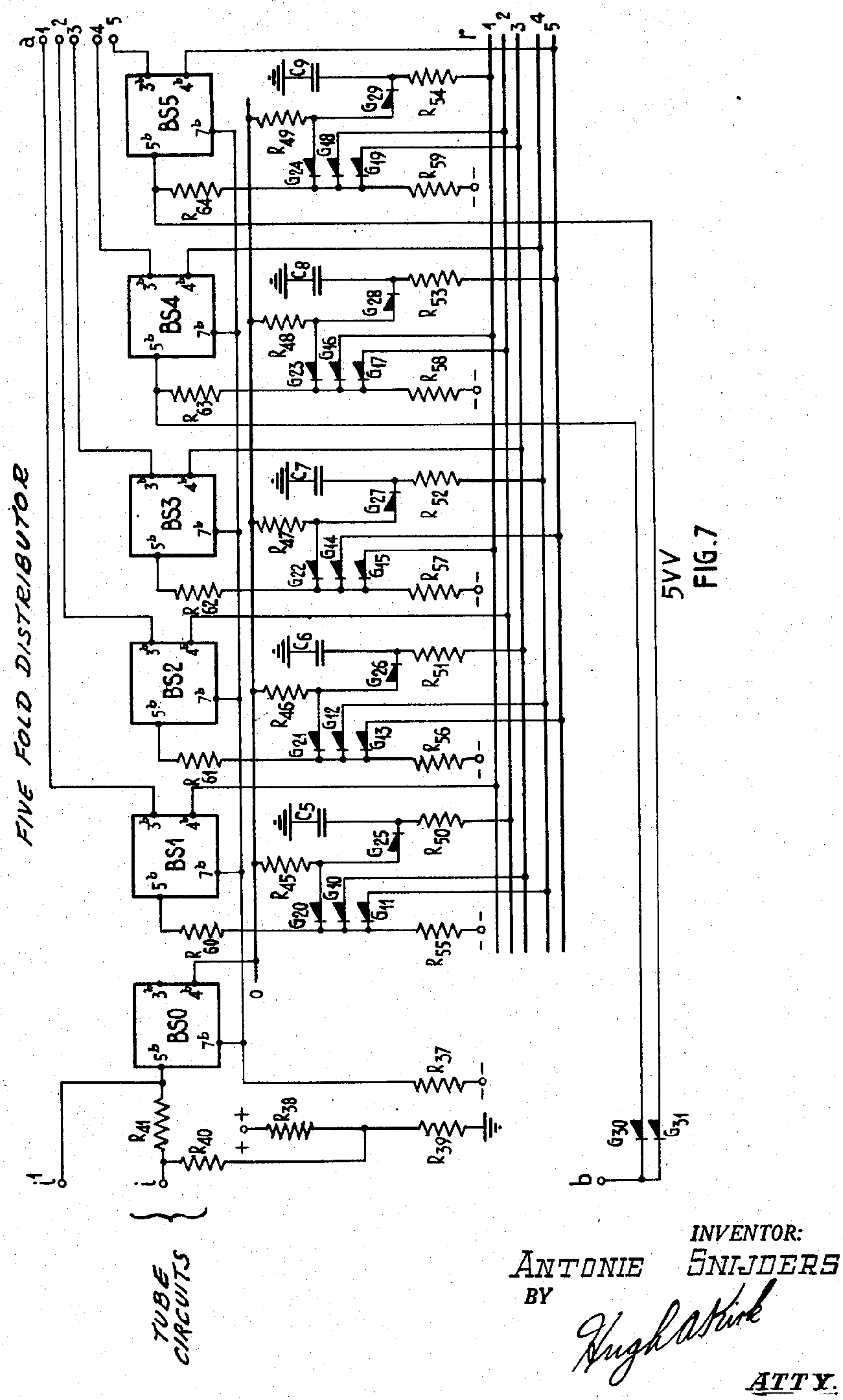
Fig. 7 is a schematic wiring diagram of the five-fold distributor 5VV shown in Fig. 15.

Fig. 7 shows how the cathodes 7*b* of all the tubes B are connected via a common cathode resistor R37 to the negative pole of the voltage source. In the initial or normal condition the input tube of circuit BS0 and the distributor tubes of circuits BS1, BS2 and BS3 are conducting. Every millisecond after the generator after G started operating it delivers a negative pulse to the input terminal *i* of this distributor 5VV. The distributor passes to a next state then, as will be described. In between positive pulses are given by the generator G, but these have no effect, because the input tube is already conductive. The fact is that its control grid is positive, because it is connected via resistors R40 and R41 (Fig. 7) to a point of positive potential on a potentiometer R39/R38 connected between the positive pole of the voltage source and ground. The grid of tube B in circuit BS0 is also connected directly to input terminal $i^1$. Terminal $3^b$ of the distributor tube circuit BS1 is connected to terminal *a*1, terminal 3 of the distributor tube circuit BS2 to terminal *a*2, etc. Terminal $4^b$ of the distributor tube circuit BS1 is connected to a first rail, which leads to terminal *r*1, terminal 4 of BS2 is connected to a second rail, which leads to terminal *r*2, etc. The input terminals $5^b$ connected to the control grids of all the distributor tubes B, are each connected via a resistor R60—R64 and two rectifiers G10—G19 to two of the said rails (*r*1—*r*5). In the distributor under discussion the control grid of the *n*th distributor tube is connected to the $(n+2)$th and the $(n+3)$th rail. Thus terminal $5^b$ of the distributor tube circuit BS1 is connected via resistor R60 and the rectifier G10 and G11 to rail 3 and rail 4, respectively. The resistors R61 to R64 and the rectifiers G12 to G19 fulfill similar functions for the other tube circuits BS2—BS5. The connecting points of the rectifiers are each connected via a resistor (R55—R59) to the negative pole of the voltage source. Thus the connecting point of the rectifiers G10 and G11 is connected via resistor R55 to the negative pole. Resistors R56 to R59 fulfill similar functions for the other tube circuits. Further these connecting points are each connected via a third rectifier (G20—G24) to a separate point, which is connected via a resistor (R45—R49) to a rail marked 0, which is connected to terminal $4^b$ of the input circuit BS0. Consequently, this rail is most of the time at − level. Thus the connecting point of the rectifier G10 and G11 is connected via the rectifier G20 to a point connected in its turn via resistor R45 to the zero rail (0). The rectifiers G21 to G24 and the resistors R46 and R49 fulfill similar functions for the other tube circuits. Moreover, the said points are each connected not only to the zero rail (0), but also via a rectifier (G25—G29) to a point that with a certain delay takes over the potential of the rail connected to terminal $4^b$ of the next tube circuit. Thus in the case of the first tube circuit this point is connected via the rectifier G25 to the connecting point between a capacitor C5 of which the other terminal is grounded, and a resistor R50 the other terminal of which is connected to rail *r*2. The rectifiers G26 to G29, the capacitors C6 to C9, and the resistors R51 to R54 fulfil similar functions for the other tube circuits.

In the initial state, the distributor tubes of circuits BS4 and BS5 are non-conductive. This implies that the output terminals $4^b$ of the distributor tube circuits BS4 and BS5 are at + level, so rails 4 and 5 are positive. Because rail *r*4 is positive, tube of circuit BS2 is supplied via rectifier G12, with a positive grid voltage and is conductive. The rectifiers G12, G13 and G21 form a relay cell, of which the common point is connected via resistor R56 to the negative pole of the voltage source and the output terminal of which relay cell corresponds to input terminal $5^b$ of the distributor tube circuit BS2, and always passes the most positive of the voltages occurring at the rectifier terminals not connected to the common point. In the same way tube of circuit BS1 is conductive due to a positive voltage supplied via rectifier G11. Because rail *r*5 is positive, the tube of circuit BS3 is conductive due to a positive voltage supplied via the rectifier G14; and tube of circuit BS2 receives again via the rectifier G13 a positive voltage. Consequently, in the initial state, tubes 1, 2 and 3 are conductive.

If a negative pulse is received at the control grid of the input tube B of distributor circuit BS0, this input tube becomes non-conductive for a moment, and rail 0 becomes positive for a moment. This has no influence on tubes of circuits BS1, BS2 and BS3, since these tubes are already conductive. The tube of circuit BS4 however, becomes conductive now, because via the resistor R48, the rectifier G23 and the resistor R63 the control grid becomes positive. The tube of circuit BS5 remains non-conductive, because the positive pulse is absorbed by the negatively charged coating of the capacitor C9, since rail *r*1 was negative and the capacitor C9 coating connected to it remains negative, also when rail *r*1 becomes positive. And this happens, since, tube of circuit BS4 having become conductive, the control grid of tube of circuit BS1 is no longer supplied via the rectifier G11 with a positive voltage, so tube of circuit BS1 becomes non-conductive and rail *r*1 becomes positive, as soon as rail 0 is again negative. At each negative pulse the distributor receives 5VV, it advances by one step.

In order that in the initial state the tubes of circuits BS4 and BS5 are always non-conductive and the tubes of circuits BS1, BS2 and BS3 are conductive, the control grids of the said tubes of circuits BS4 and BS5 connected to their terminals $5^b$, are connected via rectifiers G30 and G31 to terminal $b$ of the distributor circuit 5VV. By seeing to it that in the normal condition of the measuring set this terminal $b$ has a negative potential, it is obtained that the distributor always commences to operate from the correct initial state and may be kept in the initial state if desired.

In Fig. 15 of the distributor 5VV, only the input terminals $i$ and $b$ and the output terminals $a1$ to $a5$ and $r1$ to $r5$ are shown. Terminal $b$ is connected to output terminal 4 of the auxiliary start-stop circuit HSS (Fig. 12), by which it is obtained that the distributor 5VV, when started, is in the correct initial state. As soon as the measuring set is started, this locking is removed. To facilitate things a table has been drawn in the square 5VV, distributor square 5VV in Fig. 15, indicating for positions S1 to S5 of the distributor whether tubes B1 to B5 of circuits BS1 to BS5, respectively, are conductive or non-conductive. Conductivity of a tube is indicated by the symbol "−", non-conductivity by the symbol "+", because in the former case the relevant output terminals have a lower voltage than in the latter.

Figure 2:
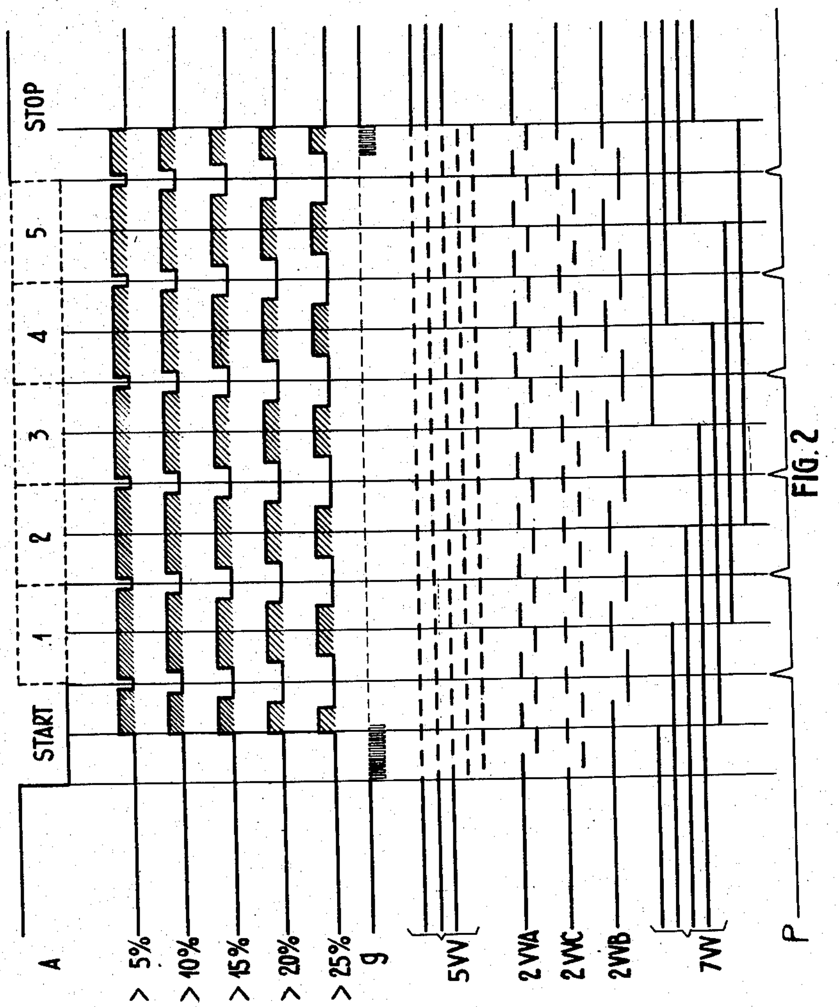
Fig. 2 is a schematic time diagram of the pulses of a complete multi-element telegraphic code signal and the corresponding workings of several different parts of the measuring set of Fig. 1.

In Fig. 2 the lines marked 5VV show the operation of the fivefold distributor, each horizontal line representing the successive states of one of the five tubes of circuit BS1—BS5; a drawn part corresponding to the conductive state, an interruption to the non-conductive state. As can be seen, the distributor assumes a next state after each period or cycle of the generator G (wave $g$ in Fig. 2).

III–2. TWO TWO-FOLD DISTRIBUTORS 2VVA AND 2VVC

Fig. 15 shows, besides the distributor 5VV, three twofold distributors, viz. 2VVA, 2VVB and 2VVC, and a sevenfold distributor 7VV. As construction and working of these distributors are in principle as those of the distributor 5VV, a detailed description can be dispensed with. As in the case of the distributor 5VV a table given in each of the relevant boxes shows the states of the tubes. The fivefold distributor and the twofold distributors serve to deliver in cooperation, during a cycle of the measuring set, a time scale with respect to which the distortion in the received signal can be determined. The seven-fold distributor 7VV is necessary to ensure that the polarities of the elements of signal received or to be transmitted are passed on at the correct moments.

The cooperation of the distributors will now be described. After each cycle of the distributor 5VV this circuit passes at its output terminal $a3$ via capacitor C10 a negative pulse to the input terminal $i^a$ of the distributor of 2VVA, which is thereby put in a next state. Input terminal $b^a$ of the distributor of 2VVA is connected to input terminal $b$ of the distributor 5VV, as a result of which it is obtained that the distributor 2VVA starts from a desired initial state. In Fig. 2 lines 2VVA show in the manner described above the operations of this distributor.

After the first two steps in each cycle of the distributor 5VV this circuit passes, at its output terminal $a5$ via capacitor C11, a negative pulse to the input terminal $i^c$ of the distributor of 2VVC, which is thereby put in a next state. In this case too, input terminals $b^c$ is connected to input terminal $b$ of the distributor 5VV. In Fig. 2, the lines marked 2VVC show the operation of this distributor.

After the first cycle of the distributor 2VVA this circuit passes at its output terminal $a1$ via capacitor C12 a negative pulse to the input terminal $i^v$ of the distributor 7VV, which is thereby put in a next state. Input terminal $b^a$ of the distributor 2VVA is connected to the other terminals $b$, $b^v$ and $b^c$.

III–3. A TWO-FOLD AND A SEVEN-FOLD DISTRIBUTOR AND AUXILIARY CIRCUIT 2VVB, 7VV, AND H7VV

After the first step of the distributor 2VVA (a half-cycle) this circuit passes at its output terminal $a^a2$ via capacitor C13 a negative pulse to the input terminal $i^b$ of the distributor of 2VVB. This pulse has no effect, however, because at that moment input terminal $b^b$ is still connected to a point having a negative potential, so that the distributor 2VVB is locked in its initial state. The said point of negative potential is output terminal 4 of the auxiliary circuit H7VV of the sevenfold distributor 7VV. The auxiliary circuit H7VV may be again a standard circuit according to Fig. 3. Its input terminal 7 is connected via rectifiers G32 and G33 to the output terminals $r1$ and $r4$, respectively, of the distributor 7VV. As long as the distributor 7VV is in the initial state, and only then, these terminals are negative. Via resistor R65 input terminal 7 of the auxiliary circuit H7VV is further connected to the negative pole of the voltage source. As a result of this in the initial state of the distributor 7VV terminal 7 of the auxiliary circuit H7VV is negative, and, consequently, also its output terminal 4: thus the distributor 2VVB is locked. After 1½ cycles of the distributor 2VVA another negative pulse appears at terminal $i^b$ of the distributor 2VVB. This time the distributor 7VV is no longer in its initial state. Via the rectifier G32 terminal 7 of the auxiliary circuit H7VV has been supplied with a positive potential, so terminal 4 is at + level. The distributor 2VVB now passes to a next state, as is indicated in Fig. 2 on the lines marked 2VVB. Henceforth the distributor 2VVB will advance by one step at each negative pulse from terminal $a^a2$ of the distributor 2VVA via the capacitor via C13.

After two cycles of the distributor 2VVA another negative pulse goes to terminal $i^v$ of the distributor 7VV. As in the meantime, however, the distributor 2VVB has assumed state 2, its output terminal $rb1$ will be positive. Via rectifier G34 terminal $i^{1v}$ of the distributor will be positive in consequence, so the control grid of its input tube will remain positive. In this way the negative only every second one of the pulses delivered by the distributor 2VVA to the distributor 7VV causes the latter circuit to step on. This step-by-step advance of the distributor 7VV is represented in Fig. 2 by the lines marked 7VV and occurs at moments coinciding with the middle of the theoretical duration of the elements. Thus it is obtained that 130 milliseconds after the beginning of the reception of the start element of signal A, the distributor 7VV and all the other distributors have been restored to normal.

The auxiliary circuit H7VV which only in the initial state of 7VV has a negative input terminal, is put to still another use. When via rectifier G4 the start element of the signal has rendered the input terminal 7 of the auxiliary start-stop circuit HSS (Fig. 12) positive, i.e. put the measuring set in operation, it must remain operative for the entire reception of the signal. So the said input terminal must remain positive, even if an element of a negative polarity is received: thus the auxiliary start-stop circuit HSS must be locked. As soon as the auxiliary circuit H7VV has left the initial state, i.e. as soon as the distributor 7VV has made the first step, its output terminal is at + level, so via the rectifier G7 input terminal 7 of the auxiliary start-stop circuit HSS remains positive for the entire further duration of the cycle of the distributor 7VV.

As soon as the distributor 7VV returns to the initial state, however, the said input terminal will be under the control of the polarity of the received element again and on reception of the "stop" element, it is supplied with a negative potential; i.e. when the measuring set stops. In the case of a false start, the measuring set receiving start polarity for less than 10 milliseconds, the auxiliary start-stop circuit HSS is not yet locked. After the disappearance of the start polarity output terminal 4 of the auxiliary start-stop circuit HSS immediately becomes negative again, the generator G stops and via their respective input terminals $b$, $b^a$, $b^c$, $b^v$, the distributors will be controlled so as to be restored to normal.

III–4. STANDARD TIME CORRECTION CIRCUITS SC, SI AND SF

Figure 14:
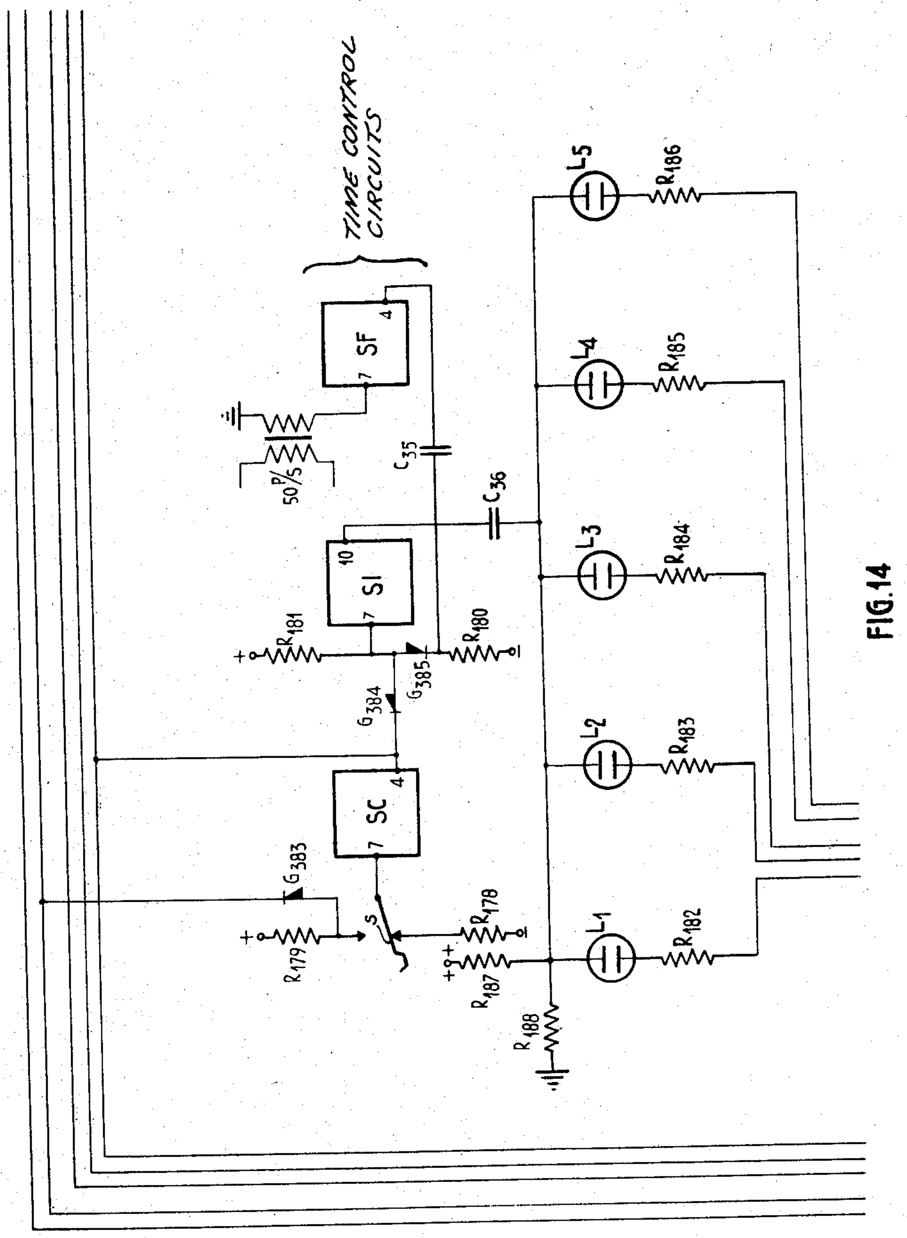

A correct operation of the time scale is for the measuring set of the greatest importance, because only by means of a correct time scale can correct distortion figures be measured. Consequently, it will be necessary that from time to time the time scale can be gauged. The circuits required for this purpose are shown in Fig. 14. There are three time scale controlling circuits, SC, SI and SF, which may all be standard circuits according to Fig. 3. Further use is made of five neon indicator tubes L1 to L5.

When no control of the time scale is carried out, input terminal 7 of the time scale controlling circuit SC is connected via a switch *s* to a contact point which is at − level via resistor R178. If a check is desired, the switch *s* is changed over to the other contact point, so that input terminal 7 is then via resistor R179 in connection with + level. The input terminal 7 itself will only become positive, however, if rectifier G383, which is also connected to this contact point, is at + level. The rectifier G383 is connected to output terminal 9 of the receiving circuit OS. Consequently, a check can only be carried out in the false rest condition.

Figure 23:
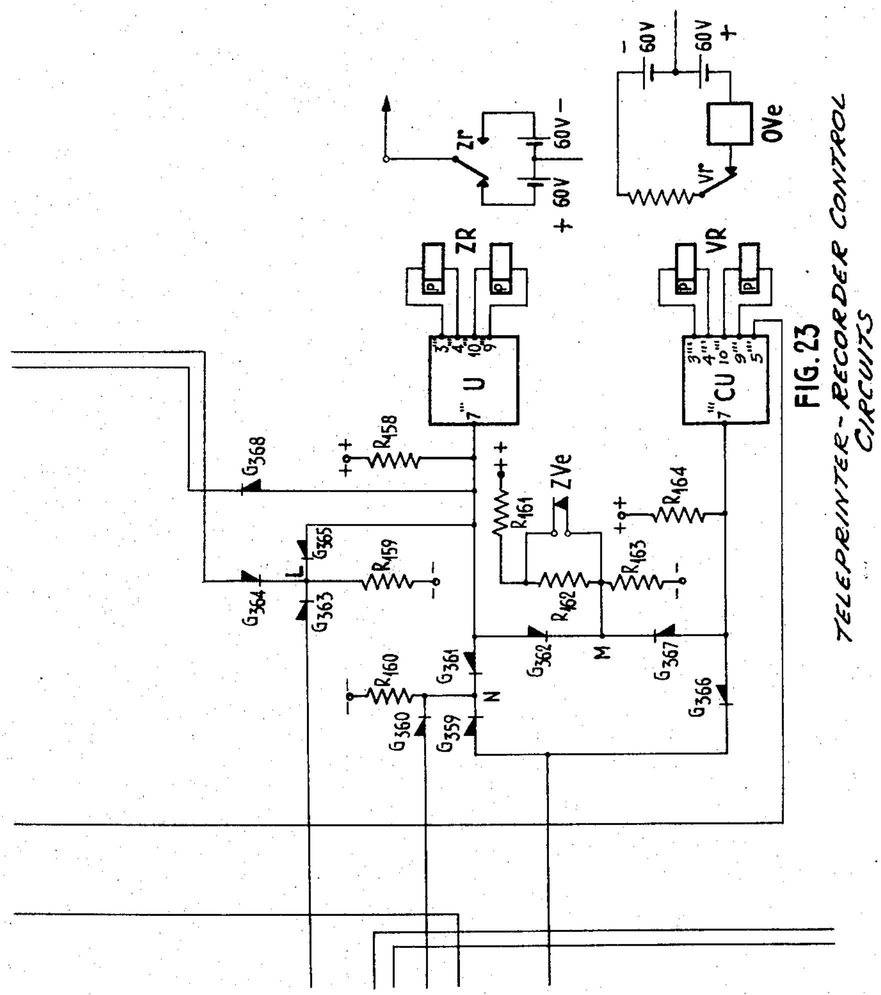
Figure 24:
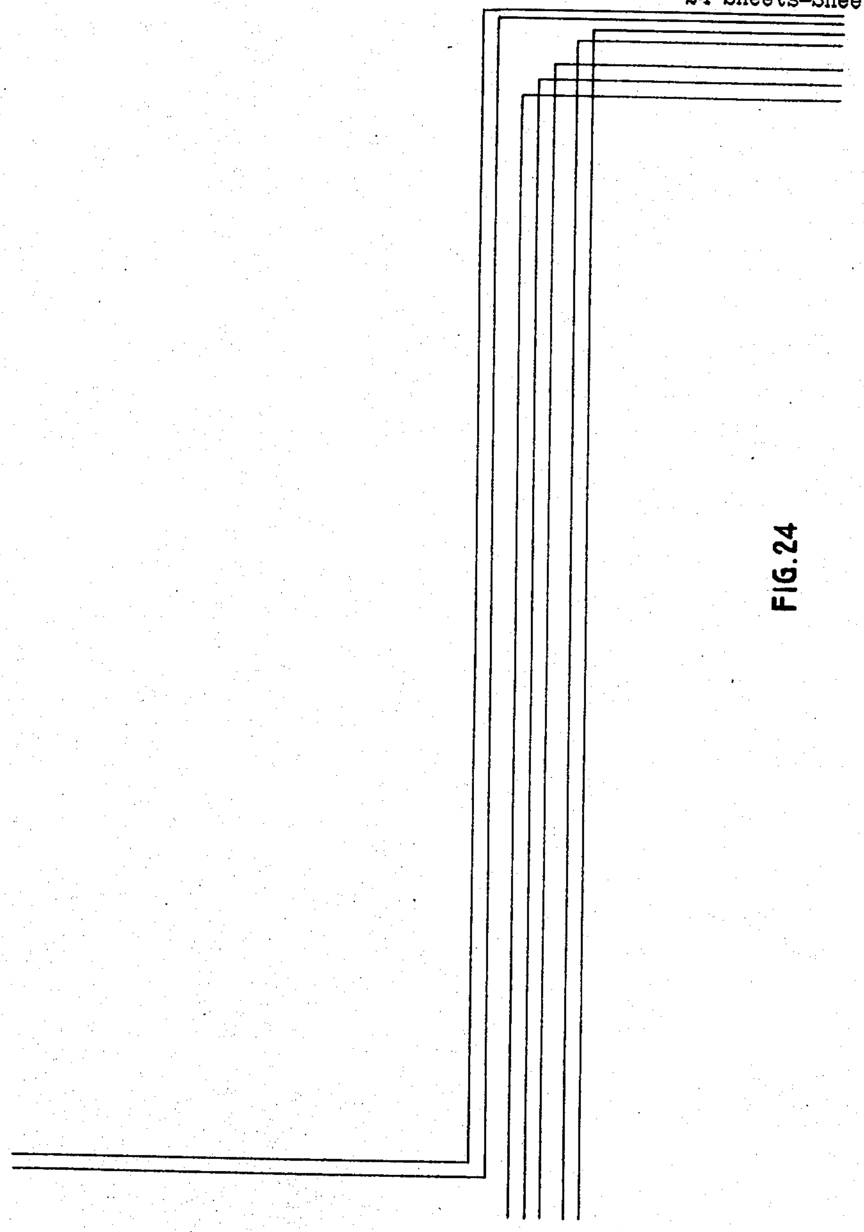

The time scale controlling circuit SC assumes the positive (+) state then, its output terminal 4 becomes positive and renders input terminal 7 of the auxiliary start-stop circuit HSS (Fig. 12) positive too, via rectifier G5. As a result of this generator G and the time scale will become operative and remain operative as long as the time scale controlling circuit SC remains in the positive (+) state. Further input terminal 7 of the circuit OZT (Fig. 19), as will be described later in Sections VII, VIII and IX, is rendered positive via the rectifier G358. The output terminal 4 of this circuit OZT becomes positive too, as well as the point N via rectifier G359, (Fig. 23). At the same time point L is rendered positive via the rectifier G363. In the false rest condition, point M is positive as well as output terminal 9 of the auxiliary delayed stop circuit HSV. So input terminal 7‴ of the output circuit U is only connected to points of positive potential and becomes positive itself. At the contact *zr* a positive voltage is delivered to the outgoing line and the measuring set is found busy, when called while a time check is being made.

Output terminal 4 of the time scale controlling circuit SC is connected via rectifier G384 to input terminal 7 of the time scale controlling circuit SI. This input terminal is also connected on one hand via a resistor R181 to the positive (+) level, on the other hand via a rectifier G385 to the connecting point of a capacitor C35 and a resistor R180, this resistor being connected at the other end to the negative (−) level. The capacitor C35 is connected on the other hand to output terminal 4 of the time scale controlling circuit SF. The primary winding of a transformer is supplied with a voltage of the standard frequency of 50 cycles, which is used for the gauging. The secondary winding of this transformer is connected on one hand to ground and on the other hand to input terminal 7 of the time scale controlling circuit SF. Consequently, via the capacitor C35 positive and negative pulses will issue from output terminal 4 of the time scale controlling circuit SF. The negative pulses have no effect, the positive pulses, which appear every 20 milliseconds, insure that input terminal 7 of the time scale controlling circuit SI is supplied with a positive potential via the rectifier G384 as well as via the rectifier G385 and, consequently, becomes positive itself, so the time scale controlling circuit SI will pass every 20 milliseconds a negative pulse from its output terminal 10 via capacitor C36.

These pulses are applied to five neon indicator tubes L1 to L5. These tubes are connected on one hand via resistors R182 to R186, respectively, to output terminals *a*1 to *a*5 of the distributor 5VV (Fig. 15), on the other hand they are connected together to the tapping point of a potentiometer R187/R188, the ends of which are connected to the positive pole of the voltage source and to ground, respectively. The potential of the tapping point is such that normally the potential difference between the electrodes of the tubes is insufficient to light these tubes. If, however, via the capacitor C36 a negative pulse reaches the electrodes which are connected to the said tapping point, those tubes are lit for which the other electrodes are connected at that moment to an output terminal associated with the anode of a non-conducting tube of the distributor 5VV. After 20 milliseconds another negative pulse arrives. If the time scale is correct, there have been exactly four cycles of the distributor 5VV at that moment, so the same tubes are to light. If the time scale is not correct, the tubes being placed in a circle, the lit tubes will be seen to move to the left or to the right. Resistor R36 of the generator G (Fig. 12) is then adjusted until every time the same tubes light, so use is made of something like a stroboscopic effect.

For this purpose a distributor of the time scale is needed, which between two successive pulses of the standard frequency performs a whole number of cycles. This number of cycles must not be too large, however, because then there would be a danger that every time the same tubes would light, it is true, which would bring one to the conclusion that the time scale is correct, but that this correctness is not bound to exist indeed, because the distributor may as well perform another whole number of cycles between two successive pulses of the standard frequency. Further two successive states in a cycle of the distributor must follow each other sufficiently closely, since otherwise the same tubes will light, also in the case of an inadmissible incorrectness of the time scale, if the observation is carried on for too short a period. In the present case the distributor 5VV meets all these requirements in any respect.

After this description of how the time scale circuit TS is started by the signal on the first path, the second route of the signal will be followed now.

IV. *Scanning and receiving circuits*

The output terminal 4 of the input circuit IN (Fig. 12) also passes the polarities of the elements of the received signal wave A (see Fig. 2) to the scanning devices A (see also Fig. 18), the waveform of the signal exhibiting rectangular edges and an amplitude of a determined value. In these scanning devices the polarity of each element must be examined in the middle of the theoretical duration of the element and passed to a receiving circuit O1—O5.

IV–1. SCANNING DEVICES AI

For such a scanning device AI use can be made of a circuit as described in my copending U.S. Patent Application Serial No. 322,180. This circuit consists of two relay cells. In my copending case of the circuit shown at the left of the circuits represented in Fig. 18, these are a relay cell having junction point E consisting of the rectifiers G35, G36 and G37 and having a common point E connected via resistor R66 to the positive pole of the voltage source, and a relay cell having junction point E consisting of the rectifiers G38, G39 and G40 and having a common point F connected via resistor R69 to the negative pole of the voltage source. In the other scanning devices the relay cells are formed by the rectifiers G41 to G64 and the resistors R70 to R85. The output terminal *a*2 of the distributor 7VV (Fig. 15) is connected to the first scanning device via resistor R86 and capacitor C14 to G36 the rectifier (point H) of the first-mentioned relay cell having junction point E. The output terminal *a*6 of the distributor 7VV is connected via resistor R87 and capacitor C15 to the rectifier G39 (point J) of the second relay cell having junction point E. In the second scanning device, terminal $a^v3$ of the distributor 7VV is connected via the resistor R88 and the capacitor C16 to the rectifier G42, terminal $a^v7$ of the distributor 7VV being connected via the resistor R89 and the capacitor C17 to the rectifier G45. In the third scanning device, terminal $a^v4$ of the distributor 7VV is connected via the resistor R90 and the capacitor C18 to the rectifier G48, terminal $a^v1$ of the distributor 7VV being connected via the resistor R91 and the capacitor C19 to the rectifier G51. In the fourth scanning device, terminal $a^v5$ of the distributor 7VV is connected via the resistor R92 and the capacitor C20 to the rectifier G54; terminal $a^v2$ of the distributor 7VV being connected via the resistor R93 and the capacitor C21 to the rectifier G57. In the fifth scanning device, finally, terminal $a^v6$ of the distributor 7VV is connected via the resistor R94 and the capacitor C22 to the rectifier G60, terminal $a^v3$ of the distributor 7VV being connected via the resistor R95 and the capacitor C23 to the rectifier G63.

Finally point H of the first scanning device is still connected via resistor R67 to the — level and point J via resistor R68 to the + level. For the other scanning device these connections are made via resistors R71 and R72, R75 and R76, R79 and R80, R83 and R84, respectively. Resistors and voltages are so chosen that, when the scanning device is inoperative, point H is negative and point J positive. As a result of this point E will be negative, because its potential is determined by the more negative of the potentials applied to the terminals of the rectifier G35 and G36. Point F will be positive, because its potential is determined by the more positive of the potentials applied to the terminals of the rectifier G38 and G39.

IV–2. RECEIVING MEMORY CIRCUITS 01–5

The rectifiers G37 and G40 are then non-conducting. The connecting point of these rectifiers is connected to input terminal 7 of receiving circuit, O1. For this receiving circuit use can be made again of the standard circuit according to Fig. 3. In this case, however, output terminal 5 is connected to input terminal 7, so that the latter will keep the potential of terminal 5, also after an impulse has disappeared from the input terminal: the receiving circuit O1 has become a so-called memory circuit. Receiving circuit O2 to O5 are also memory circuits and are connected in a similar way to the corresponding scanning devices.

When the distributor 7VV makes its second step, so at the moment coinciding with the middle of the theoretical duration of the first intelligence element of the received signal (Fig. 2), tube 2 of the distributor 7VV will become non-conductive and tube 6 conductive. Consequently, a positive pulse will pass from output terminal $a^v2$ to the point H, while a negative pulse goes from the terminal $a^v6$ to the point J. As point E always assumes a potential determined by the more negative of the potentials of point H and output terminal 4 of the input circuit IN, point E will become positive, if terminal 4 is positive too. In the other case point E will remain negative. In like manner point F always assumes a potential determined by the more positive of the potentials of point J and output terminal 4 of the input circuit IN, so point F remains positive, if point 4 is positive. In the other case point F will become negative. If terminal 4 is positive as a result of the reception of a + polarity signal element, input terminal 7 of the first receiving or memory circuit O1 will render a positive potential too, via the rectifier G37, when the above-mentioned pulses appear. If terminal 4 of the input circuit IN is negative as a result of the reception of a — polarity signal element, input terminal 7 of the receiving circuit O1 will be rendered negative via the rectifier G40 at that moment. In the latter case the receiving or memory circuit O1 will be said to be in the — state, in the former case (terminal 7 positive) the receiving or memory circuit O1 will be said to be in the + state. As the receiving circuit O1 is a memory circuit, it will remain in the same state, until, at a next cycle of distributor 7VV, the pulses required for the operation of the first scanning device appear again. According to the polarity of the intelligence element then received, the receiving circuit O1 will remain in the same state or change over to the other. In the same way receiving circuit O2 always assumes the state corresponding to the polarity of the second intelligence element, etc.

After this description of the scanning and recording of the polarities of the intelligence elements of the received signal on the second path, the third route of the signal will be followed.

V. *Distortion measuring circuits*

At each transition from one polarity to the other in the received signal, pulses of opposite polarities appear at the output terminals 3 and 10 of the input circuit IN (Fig. 12) via capacitor C24 and capacitor C25, respectively. Thus, if a + polarity element is followed by a — polarity element, a negative pulse will appear at terminal 3 and a positive one at terminal 10. The other coatings or plates of capacitors C24 and C25 are at — level via resistors R96 and R97, respectively. They are also connected to rectifiers G65 and G66, respectively. These form with rectifier G67 a relay cell having junction point K, the common point K of which is connected via resistor R98 to the negative pole of the voltage source.

V–1. PULSE CIRCUIT P

Figure 13:
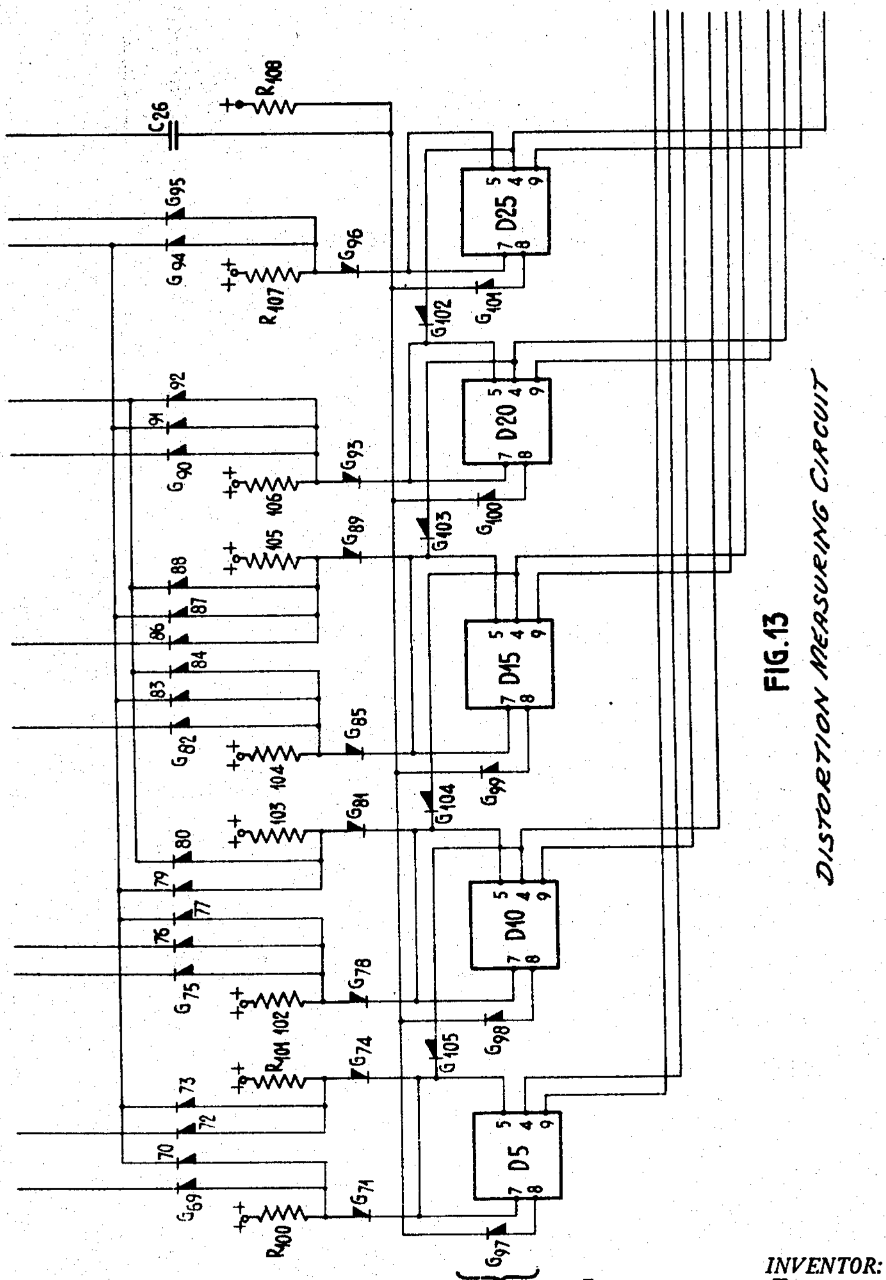

The rectifier G67 is connected by its other terminal to input terminal 8 of pulse circuit P, which terminal is further connected via rectifier G68 to output terminal 4 of auxiliary circuit H7VV (Fig. 15) and via resistor R99 to the positive pole of the voltage source. Pulse circuit P may be a standard circuit again according to Fig. 3. If the distributor 7VV is in the initial or normal state, its input terminal 8 of circuit P will be negative, as rectifiers G67 and G68 are connected to points having negative potentials then, and consequently output terminal 4 of circuit P will be negative too. This condition will only be changed at moments when in the received signal there is a transition from one polarity to the other. In that case either via capacitor C24, or via capacitor C25 a positive pulse will arrive and continue its route via rectifiers G66 or G65, respectively. The first time this occurs, i.e. in the beginning of the start element, the impulse has no effect on the potential of terminal 8 of pulse circuit P, since via rectifier G68 this terminal is supplied with a negative potential then. The following times, however, the last-mentioned potential has become positive because in the meantime distributor 7VV has left the initial state. When the positive pulse arrives at point K, terminal 8 of pulse circuit P then is bound to become positive for a moment and so is its output terminal 4. Consequently, during the transitions of polarity in the signal A, pulse circuit P delivers positive pulses at its output terminal 4, except at the first transition (see wave form P in Fig. 2). With the aid of these pulses and those of the time scale the amount of distortion will be established in the distortion measuring circuits D5, D10, D15, D20 and D25 (Fig. 13). This need not be done for the first transition of course.

V–2. DISTORTION MEASURING MEMORY CIRCUITS D5–25

Figure 3:
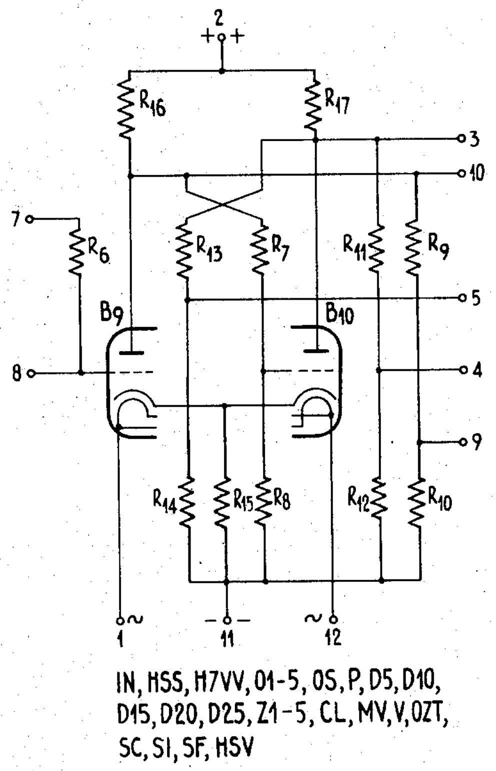
Fig. 3 is a wiring diagram of a circuit employed in several different parts of the measuring set of Fig. 1, namely the circuits IN, HSS, H7VV, O1 to O5, OS, P, D5, D10, D15, D20, D25, Z1 to Z5, CL, MV, V, OZT, SC, SI, SF and HSV shown in the composite wiring diagram of Figs. 12 through 25 inclusive.

For the distortion measuring circuits D, use may be made again of the standard circuit according to Fig. 3. Output terminal 5 is connected to input terminal 7; the D-circuits are memory circuits. In the beginning their input terminals 7 and 8 being negative; the circuits are all in the — state. The measuring circuit D5, which is to reveal a distortion of more than 5%, will have to assume the + state as soon as a positive pulse from pulse circuit P appears at a moment removed by more than 1 msec. from the theoretically correct moment. Consequently, measuring circuit D5 will have to be responsive to positive pulses appearing during periods indicated in Fig. 2 by hatching on the line marked ">5%." Thus the periods of responsiveness of measuring circuit D10 are represented in Fig. 2 on the line marked ">10%," etc. To obtain these periods of responsiveness use is made again of a control by means of relay cells (Fig. 13). The common point of each of these relay cells are connected via a resistor to the positive pole of the voltage source. Thus the input terminal 7 of the measuring circuit D5 is controlled via two relay cells consisting of (*a*) rectifiers G69, G70 and G71, the common point being supplied via resistor R100 with a positive potential, and (*b*) rectifiers G72, G73 and G74, the common point being supplied via resistor R101 with a positive potential. The rectifiers G75 to G96 and the resistors R102 to R107 perform similar functions in the other distortion measuring circuits D10, D15, D20, and D25.

Of each relay cell, one rectifier is connected to terminal 4 of the pulse circuit P (Fig. 12) and one to input terminal 7 of a distortion measuring circuit. A period of responsiveness is obtained, if of such a relay cell the other rectifiers are connected to points having a positive potential, since then, and only then, the positive pulse from the pulse circuit will be able to put the relevant distortion measuring circuit in the + state. Consequently, for each measuring circuit D the rectifiers must be connected to the correct output terminals of the distributors 5VV, 2VVA, 2VVB and 2VVC in the time scale. This means that in the desired period of responsiveness the relevant output terminals of the time scale must be positive and that, consequently, the corresponding tubes must be non-conductive. So in Fig. 2 one has to look for uninterrupted parts of the lines indicating the states of conductivity of the tubes. Transition occurring too early, as well as those occurring too late, must meet with interrupted part, which must not extend to a period of smaller distortion. The period needs only to comprise 5%, because in the case of a larger distortion the relevant D measuring circuit will be changed over by the next D measuring circuit, as will be described later.

With a view to the subsequent transmission, only the largest distortion occurring is of interest. If a distortion measuring circuit has been changed over to the + state, the distortion measuring circuits for smaller distortion must be changed over too. In order that this will certainly be the case, rectifiers G102 to G105 have been provided. If the measuring circuit D25 has been changed over, the positive potential appearing at its output terminal 4 is passed via the rectifier G102 to the input terminal 7 of the measuring circuit D20. Consequently, this circuit will be changed over and in its turn change over the measuring circuit D15, etc. The period of responsiveness of the measuring circuit D25 is the simplest to obtain. For this purpose only one additional rectifier (G95) is needed, which is connected to output terminal $r^{b}$2 of the distributor 2VVB (Fig. 15). It can immediately be seen from Fig. 2 that in this way the measuring circuit D25 is rendered responsive to pulses appearing more than 25 milliseconds too early or too late. The second tube of the distributor 2VVB is then non-conductive. For the measuring circuit D20 two additional rectifiers (G90 and G92) are needed, the rectifier G90 being connected to terminal *r*4 of the distributor 5VV and the rectifier G92 to terminal $r^{c}$1 of the distributor 2VVC (Fig. 15). It can be seen from Fig. 2 that thus the correct period of responsiveness is obtained again. As with the remaining distortion measuring circuits, the same method is followed so that a brief enumeration of the connection made will do. For the measuring circuit D15 two relay cells are used. Of the right-hand relay cell rectifier G88 is connected to terminal $r^{c}$1 of the distributor 2VVC and the rectifier cell G86 to terminal *r*3 of the distributor 5VV. Of the left-hand relay cell G84 is connected to the terminal $r^{c}$1 of the distributor 2VVC, relay cell rectifier G82 to the terminal $r^{a}$1 of the distributor 2VVA. For the measuring circuit D10 also, two relay cells are used. Of the right-hand relay cell rectifier G80 is connected to terminal $r^{c}$1 of the distributor 2VVC; of the left-hand relay cell rectifier G76 is connected to terminal $r^{a}$1 of the distributor 2VVA and the relay cell rectifier G75 to terminal *r*1 of the distributor 5VV. For the measuring circuit D5 too, two relay cells are used. Of the right-hand relay cell rectifier G72 is connected to terminal *r*1 of 5VV; of the distributor the left-hand relay cell rectifier G69 is connected to terminal *r*2 of the distributor 5VV.

It is obvious that another combination of distributors for the time scale TS and the choice of other output terminals of the time scale can also lead to the object in view, if only the method set forth above is followed.

Figure 19:
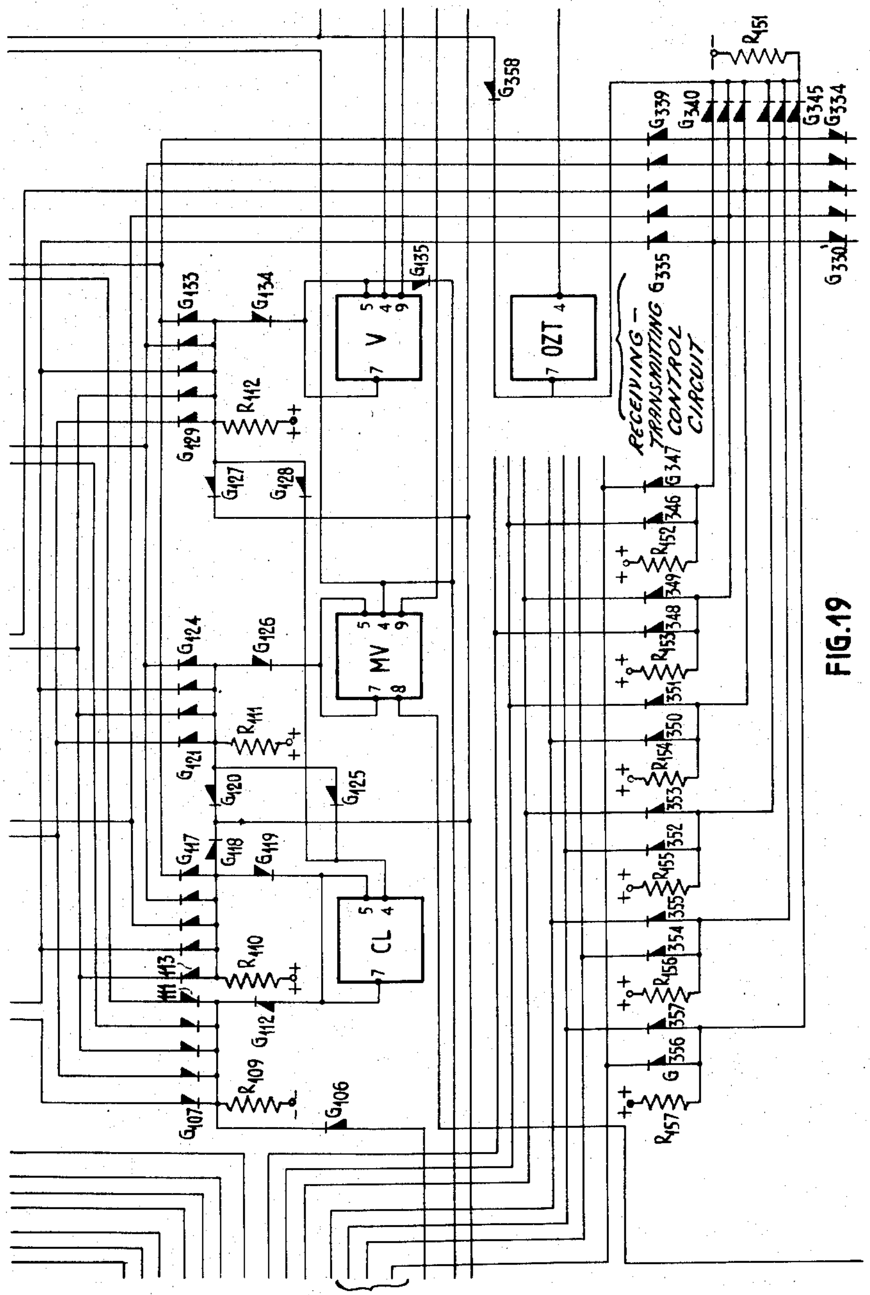

After this description of the recording in the distortion measuring circuits of the largest distortion that occurred in the received signal, it will be described now when and how the measuring set is changed over to the transmitting condition. This is done by means of the marking circuits CL, MV and V, which are shown in Fig. 19.

VI. *Transmission control circuits*

The marking circuits CL, MV and V, not only control the transmission of the recording from the distortion measuring circuits D5–25, but also the transmission of the name of the measuring set. The states of these marking circuits determine if there will be a transmission and what is transmitted, that is, the name or the percentages between which lie the largest amount of distortion measured. The control circuit BO controls the transmitting circuits Z1–5 directly and is itself controlled, among other circuits, by the marking circuits CL, MV and V for which use can be made again of the standard circuit according to Fig. 3. Each output terminal 5 is connected to the corresponding input terminal 7, therefore the marking circuits also are memory circuits. In the initial state their input terminals 7 are negative, so that the circuits are in the − state then. The marking circuit CL must be changed over as soon as the signal "Figures" is received. If then the question "Who?" is received, the marking circuit MV must be changed over. If "?" is received, the marking circuit MV as well as the marking circuit V must be changed over. In order to obtain this the input terminals are controlled again by relay cells.

VI–1. MARKING CIRCUITS AND THEIR FUNCTION CL, MV, AND V

Input terminal 7 of the marking circuit CL is controlled by two relay cells. One of these is connected via rectifiers G107 through G111 to the output terminals 9 of the receiving circuits O1 to O5 (Fig. 18), via rectifier G106 to output terminal 4 of the auxiliary circuit H7VV (Fig. 15), and via rectifier G112 to input terminal 7 of the marking circuit CL, the common point of this relay cell being connected via resistor R109 to the negative pole of the voltage source. The other relay cell is connected via rectifiers G113 through G117 to terminal 9 of the receiving circuit O3 and terminals 4 of receiving circuit O1, O2, O4 and O5 (Fig. 18), via rectifier G118 to output terminal 9 of the auxiliary circuit H7VV (Fig. 15) and via rectifier G119 to terminal 7 of the marking circuit CL, the common point of this second relay cell being connected via resistor R110 to the posiitve pole of the voltage source. Input terminal 7 of the marking circuit MV is controlled by one relay cell, of which rectifiers G121 through G124 are connected to the terminals 9 of the receiving circuits O2 and O3 and the terminals 4 of the receiving circuit O1 and O4, rectifier G125 to terminal 4 of the marking circuit CL, rectifier G120 to terminal 9 of the auxiliary circuit H7VV, and rectifier G126 to input terminal 7 of the marking circuit MV, the common point of this relay cell being connected via resistor R111 to the positive pole of the voltage source. Input terminal 7 of the marking circuit V also is controlled by one relay cell, of which rectifiers G129 through G133 are connected to the terminals 9 of the receiving circuits O2 and O3 and the terminals 4 of the receiving circuits O1, O4 and O5, rectifier G127 to terminal 9 of the auxiliary circuit H7VV, rectifier G128 to terminal 4 of the marking circuit CL and rectifier G134 to input terminal 7 of the marking circuit V, the common point of this relay cell being connected via resistor R112 to the positive pole of the voltage source. Moreover output terminal 5, and, consequently, also input terminal 7, is connected via rectifier G135 to output terminal 4 of the marking circuit MV.

As long as the process of setting the circuits O in accordance with the polarities of the elements of a received signal is in progress, so as long as the auxiliary circuit H7VV is in the + state, the rectifier G106 will be connected to a point of positive potential and the common point of the left-hand relay cell in Fig. 19 to marking circuit CL will be positive; and the rectifier G112 will block. The rectifier G118 will then be connected to a point of negative potential and the common point of the right-hand relay cell of the marking circuit CL will be negative; and the rectifier G119 will be blocked. So the marking circuit CL will remain in the state it assumed lastly. In like manner the rectifier G120 will be connected to a point of negative potential; and the rectifier G126 will be blocked and marking circuit MV will remain in the state it assumed lastly. In like manner the rectifier G127 will be connected to a point of negative potential, so the rectifier G134 also will be blocked, and the marking circuit V will remain in the state it assumed lastly. Thus it has been achieved that the receiving circuit O1–5 can only influence the states of the marking circuits, when the auxiliary circuit H7VV has reached the − state again, i.e. when the polarities of all the intelligence elements of the received signal have been recorded in the receiving circuits O1–5. So this is the correct moment.

When next the signal "figures" is received, i.e. when, consequently, the receiving circuits O1, O2, O4 and O5 assume the + state and the receiving circuit O3 the − state (these states and other mentioned below correspond to signals of the international telegraph alphabet No. 2), and in this case only, all the rectifiers G113 through G117 are all connected to the positive level; the common point of the right-hand relay cell of the marking circuit CL is positive, then and via the rectifier G119, the marking circuit is put in the + state. If next the signal "letters" would be received, so if, consequently, all the receiving circuits O1–5 are put in the + state, all the rectifiers G107 through G111 are connected to the − level; the common point of the left-hand relay cell of the marking circuit CL is negative then and via the rectifier G112 the marking circuit CL is put in the − state again. On reception of other signals than "letters," the marking circuit CL remains in the + state.

If next the signal "Who?" is received, so if the receiving circuit O1 and O4 assume the + state, and the receiving circuits O2, O3 and O5 the − state, or if "?" is received, so if the receiving circuits O1, O4 and O5 assume the + state and O2 and O3 the − state, and the receiving circuits in these cases only; rectifiers G121 through G124 are all connected to the positive level. As the marking circuit CL is in the + state, the rectifier G125 is connected to the positive level too; the common point of the relay cell is positive, and via the rectifier G126 the marking circuit MV is put in the + state. Only if "?" is received, the rectifiers G129 through G133 are all connected to the positive level as well. As the marking circuit CL is in the + state, the rectifier G128 is also connected to the positive level, the common point of the relay cell is positive and via the rectifier G134, and the marking circuit V is put in the + state. The fact is that also via the rectifier G135 the input terminal is connected to the positive level, because the marking circuit MV is in the + state.

Now the influence of the change-over of the marking circuits on the working of the measuring set will be examined. When the signal "Who?" or "?" has been received, the calling teleprinter will send no further signals for the moment, since the measuring set is supposed to answer then. For this purpose it is necessary in the first place that the time scale TS is started, and more particularly the distributor 7VV, as this circuit is needed for the transmission of signal elements of the correct duration. This start is effected by the marking circuit MV which supplies via output terminal 4 + level to the rectifier G8 (Fig. 15). In the normal condition of the distributor 7VV, the rectifier G9 is supplied with + level too, so that junction point D of the relay cell is bound to become positive, and via the rectifier G6 input terminal 7 of auxiliary starts stop circuit HSS (Fig. 12) is rendered positive. The time scale now starts operating. As soon as the distributor 7VV makes one step, the said input terminal is kept positive via the rectifier G7, in a manner as described earlier, till 130 milliseconds after the start. The desired duration of the stop element of the signal to be transmitted, viz. preferably 20 or 30 milliseconds, is adjusted by means of the variable resistor R21. The fact is that capacitor C1, which during a cycle of the distributor 7VV is charged via resistors R20 and R21 with a negative charge, will not immediately have a negative charge after 130 milliseconds, as a result of which the time scale would immediately start for a new cycle. The length of the delay thus obtained, so also the duration of the stop element, is adjusted by means of the resistor R21. It is also seen to that via the rectifier G3 the input terminal 7 of the input circuit IN (Fig. 12) also is kept positive, so that if a signal arrive at the input terminal of the measuring set, the start element of such a signal cannot have any effect thereon during this time.

VI–2. TRANSMISSION SIGNAL DISTRIBUTOR 16VV

In the second place the change-over of the marking circuits must cause the start of the 16-fold distributor 16VV (Fig. 16), which will allow the successive transmission of 16 different signals. Generally for the transmission of *n* signals, use can be made of an *n*-fold distributor. The distributor 16VV is embodied as a combination of the two fourfold distributors 4VVA and 4VVB, as is shown in Fig. 16 in the manner already described. At the top of Fig. 10 the state of conductivity of the tubes is represented according to the method of Fig. 2. At the end of each cycle of the distributor 4VVA, a negative pulse passes from the output terminal $a''2$ of this distributor via capacitor C29 to input terminal $i'''$ of the distributor of 4VVB. Consequently, after each cycle of the distributor 4VVA, the distributor 4VVB advances by one step. The distributor 4VVA in its turn gets the negative pulses for its control from output terminal 10 of the auxiliary circuit H7VV (Fig. 15) via capacitor C28. This occurs every time the distributor 7VV makes the first step of its cycle. These negative pulses remain without effect, however, as long as input terminals $b''$ and $b'''$ of the distributors 4VVA and 4VVB are at − level. As long as the measuring set is in the receiving condition this locking is operative, since input terminals $b''$ and $b'''$ are connected via resistor R113 (Fig. 15) to output terminal 4 of the marking circuit MV (Fig. 19) and in the receiving condition this terminal is negative. When the marking circuit MV is changed over to the + state, terminal 4 immediately becomes positive; its output terminals $b''$ and $b'''$ will remain negative for a few moments, however, because capacitor C27, of which one plate or coating is connected to the register R113 and the other to ground, does not immediately have a negative charge. Thus after the change-over of the marking circuit MV the first negative pulse from output terminal 10 of the auxiliary circuit H7VV remains still without effect; further pulses, however, will each time cause the distributor 16VV to advance by one step. At each state of the distributor 16VV the transmitting circuits Z1–5 (Fig. 20) are put in states corresponding to the polarities of the intelligence elements of the signals to be transmitted. For the circuits transmitting circuit Z, use can be made again of the standard circuit according to Fig. 3, and sixteen signals can successively appear in these circuits. The transmission of these signals will be described later, as well as the working of the control unit for the circuit Z. It will first be examined how the transmission is terminated and how the measuring set is put in the receiving condition again.

Figure 16:
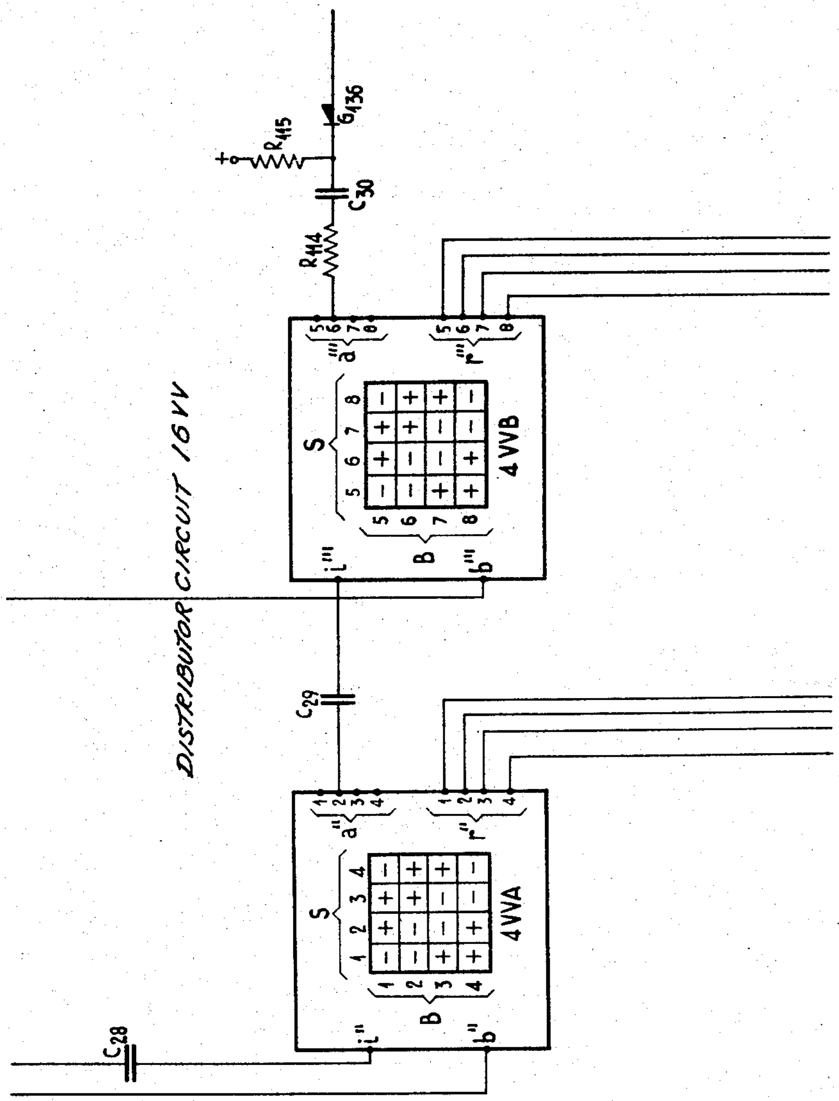

Input terminal 8 of the marking circuit MV (Fig. 19) is connected to output terminal *a'''6* of the distributor 4VVB via resistor R114, capacitor C30 and rectifier G136 (Fig. 16). The connecting point of the capacitor C30 and the rectifier G136 is further connected via resistor R115 to the + level. As has been described, the marking circuit MV is put from its initial — state into the + state via rectifier G126 on reception of the signal "Who?" or "?." This cannot be done via the rectifier G136, as this rectifier blocks this because the resistor R115 is connected to a positive voltage (see Fig. 16). After the change-over of the marking circuit MV, it remains in the + state because it acts as a memory circuit; and the rectifier G126 will then start blocking too, since in the subsequent transmitting period the receiving circuits O1–5 will assume the + state, the scanning devices A1 finding no other than + polarities.

When eventually, as a result of a pulse from the auxiliary circuit H7VV, the distributor 16VV returns to the initial state, tube B6 of the distributor 4VVB will pass from the non-conductive to the conductive state again and a negative pulse will appear from output terminal *a'''6* via capacitor C30. As a result of this, the rectifier G136 will be at — level for a moment and input terminal 8 of the marking circuit MV will become negative, so the marking circuit MV assumes the — state. Also after the pulse has disappeared, it remains in that state. As regards the marking circuit CL, it has been mentioned already that it assumes the — state as soon as all the receiving circuits O1–5 are in the + state. Because the marking circuit MV has returned to the — state, input terminal 7 of the marking circuit V is also rendered negative again via rectifier G135, if necessary. So after a cycle of the distributor 16VV all the marking circuits return to the — state. In the first place the marking circuit MV can no longer start the time scale then, nor keep the input terminal of the input circuit IN positive. This input terminal 7 of circuit IN, consequently, will assume a potential depending upon the polarity of the received signal elements, and the time scale will be rendered operative again by the start element of an arriving signal. In the second place, the distributor 16VV is locked again. In the third place the distortion measuring circuits D are all put in the — state again, so that they are ready for a next measurement. For this purpose the input terminals 8 of the measuring circuits D5 to D25 (Fig. 13) are connected via rectifiers G97 to G101, respectively, to a point which on one hand is put at + level via resistor R108 and on the other hand is connected via capacitor C26 to output terminal 4 of the marking circuit MV. When, consequently, the marking circuit MV is put back in the — state, its terminal 4 becomes negative and a negative pulse appears via the capacitor C26. The rectifiers G97 through G101 are for a moment connected to a point of + level and the input terminals 8 of the distortion measuring circuits D5–25 become negative. The distortion measuring circuits D5–25 assume the — state in consequence and remain in this state because they are memory circuits, also after the disappearance of the negative pulse.

VI–3. CONTROL UNIT BO

VI–3*a*. Signals Used and Their Function

Figure 17:
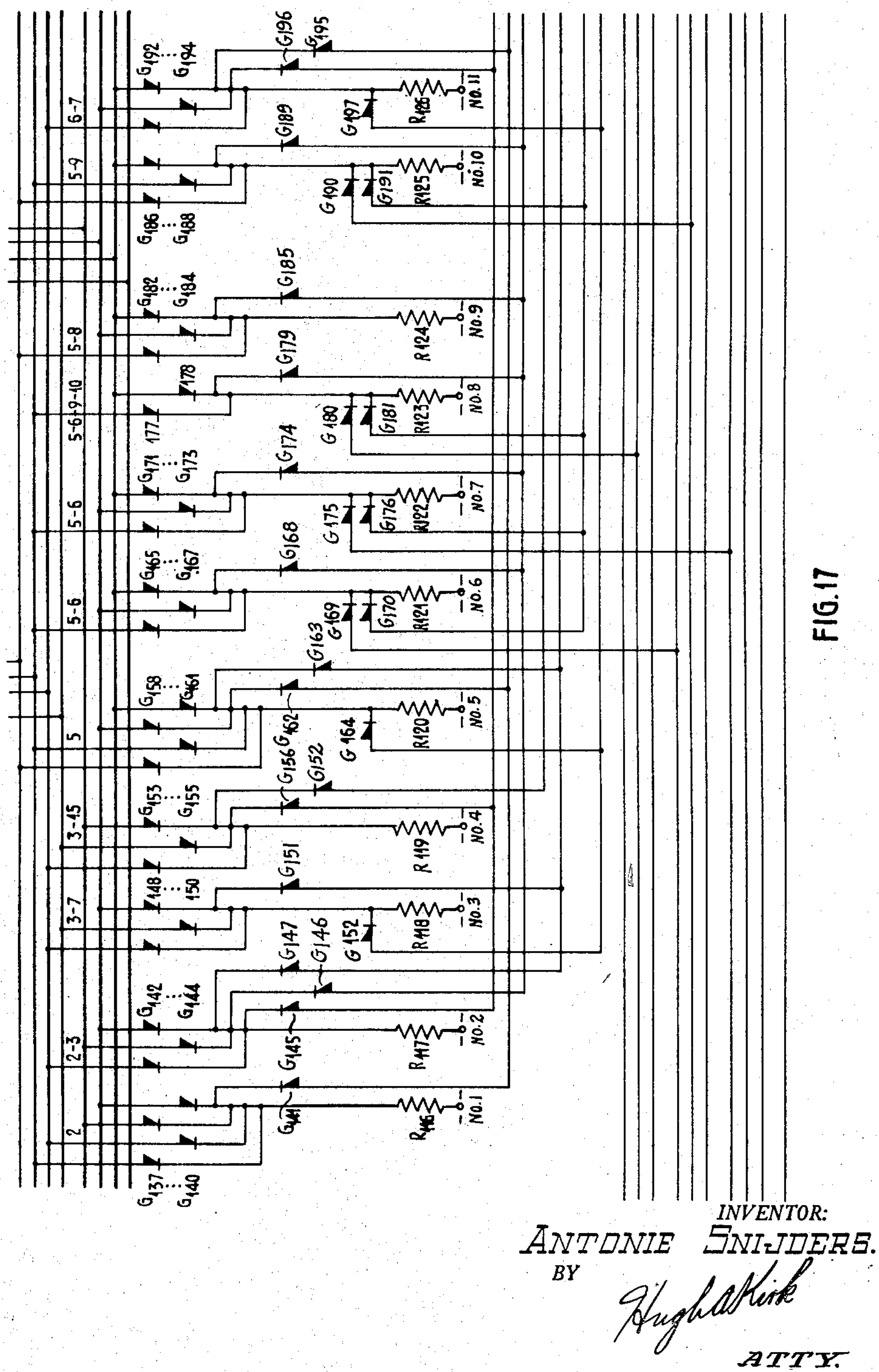
Figure 21:
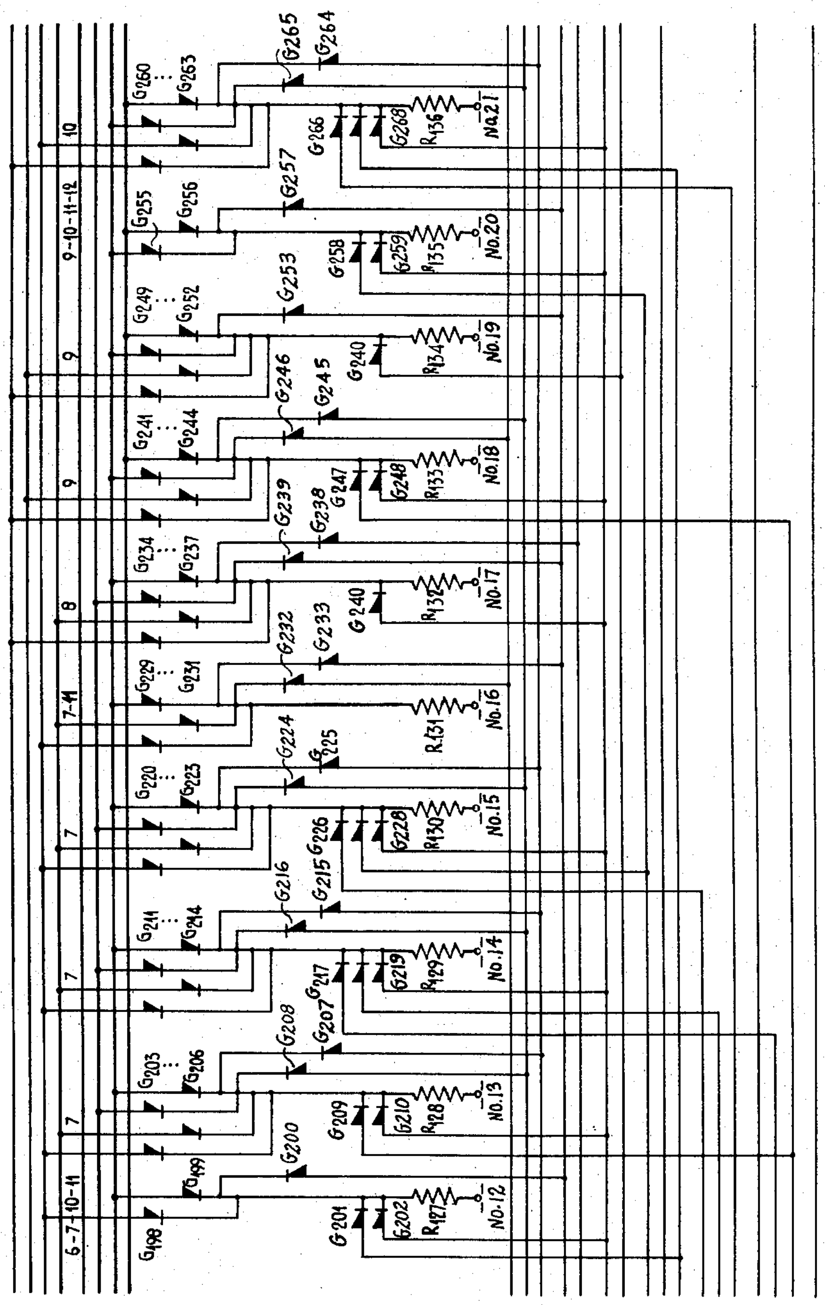
Figure 25:
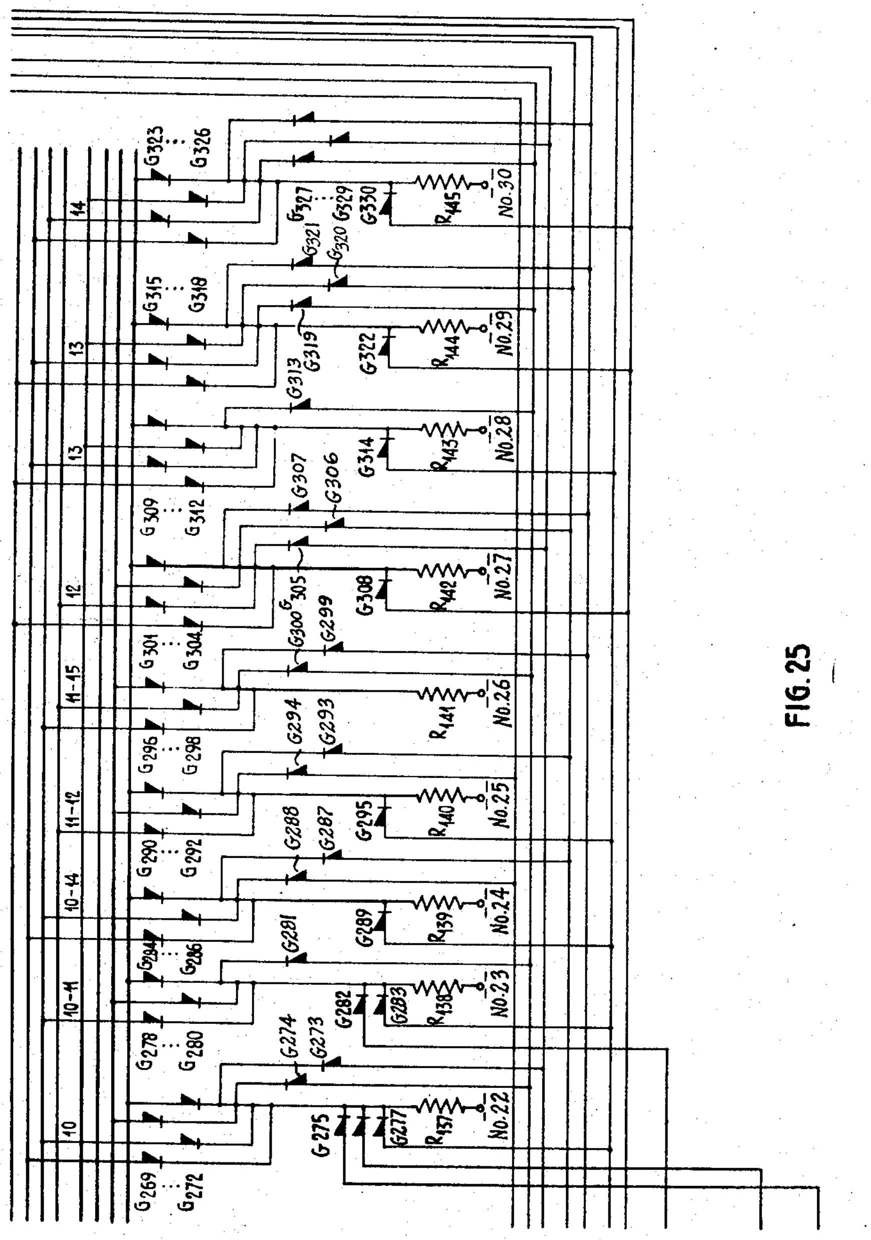

It will now be described how it has been obtained that the transmitting circuits successively assume the desired states. The control unit is shown in Figs. 17, 21 and 25. The working of it will be explained with reference to the diagrams of Figs. 9, 10 and 11. In Fig. 9 it is shown what must be transmitted, if the signal "Who?" or "?" is received. In this figure, a + polarity element is represented by a circle, a — polarity element by a circle the surface of which has been filled in in black. The code used is again the international telegraph alphabet No. 2. At the top, besides "MW," the sixteen signals are used for the transmission of the name are indicated. These signals are: (1) letters (ltt), (2) carriage return (cr), (3) line feed (lf), (4) letters (ltt), (5) D, (6) M, (7) space (sp), (8) figures (fig.), (9) 1, (10) letters (ltt), (11) space (sp), (12) A, (13) S, (14) D, (15) space (sp), and (16) letters (ltt). The signals 5 to 14 render more particularly the name of the measuring set. In the given case "DM 1 ASD" has been taken as such, DM being the abbreviation of Distortion Meter, 1 the serial number, and ASD the abbreviation of Amsterdam, the place in which the automatic telegraph exchange is installed, to which the measuring set is connected. Beside "?," the sixteen signals used for the transmission of the distortion figures are indicated. In this case the signals to be transmitted depend on the amount of distortion measured. Beside "?" the case is shown that none of the distortion measuring sets has been put in the + state, so that the largest distortion occurring was between 0 and 5%. In this case the following signals are transmitted: (1) letters (ltt), (2) carriage return (cr), (3) line feed (lf), (4) letters (ltt), (5) figures (fig.), (6) figures (fig.), (7) 0, (8) —, (9) figures (fig.), (10) 5, (11) space (sp), (12) 0, (13) /, (14) 0, (15) space (sp), and (16) letters (ltt). The signals 1 to 4, 15 and 16 correspond to those indicated in table MW. If another amount of distortion is measured, the signal 1 to 5, 8 and 11 to 16 will be the same. For the case e.g. that only the distortion measuring circuit D5 is put in the + state the table shows, beside the distortion measuring circuit D5, the signal 6 will be "figures" (fig.), (7) 5, (9) 1 and (10) 0. So instead of "0–5%," as in the former case, "5–10%" is transmitted then. Below these signals the table gives the signals to be transmitted for the other possibilities of distortion measuring, the last being "25–50%."

Figure 20:
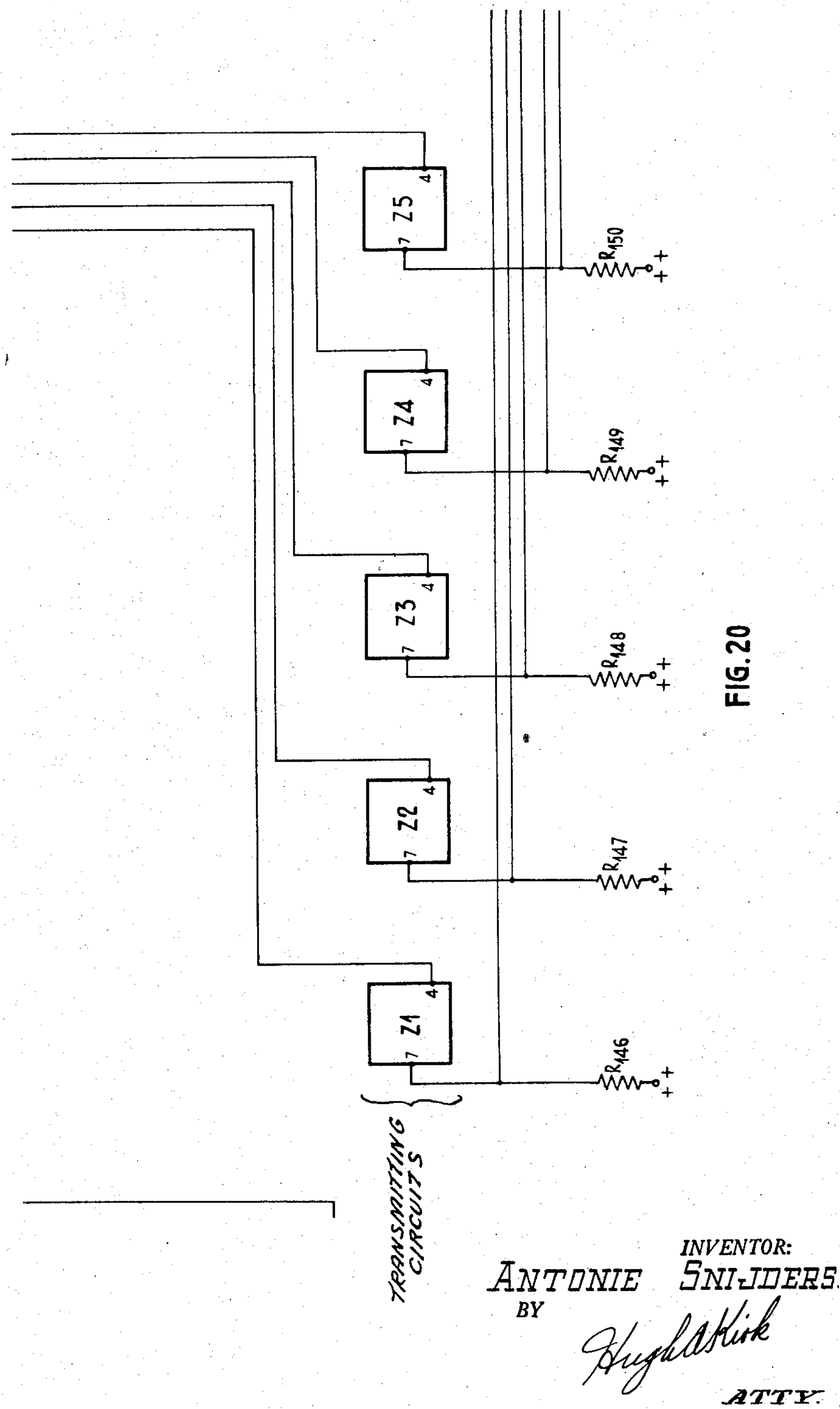

The control unit shown in Figs. 17, 21 and 25 consists mainly of a great number thirty of relay cells. Of each relay cell the common point is connected via a resistor to the negative pole of the voltage source. The rectifiers of these relay cells are connected on one hand to output terminals of the distributor 16VV, in some cases also to output terminals of the marking circuit V, and in part of these latter cases also to output terminals of the distortion measuring circuits D, and on the other hand to the common points of one or more relay cells, each of which controls one of the transmitting circuits Z1–5. The common points of these latter relay cells are each connected via a resistor to the positive pole of the voltage source and further directly to the input terminal of a transmitting circuit Z1–5. The most left-hand of the first-mentioned relay cells (see Fig. 17) consists of rectifiers G137 through G141, the common point being connected via resistor R116 to the negative pole of the voltage source. The rectifiers G137 through G140 are connected, respectively, to the output terminals *r''2*, *r''3*, *r'''5* and *r'''6* of the distributor 16VV, the rectifier G141 being connected to the common point of the relay cell which controls the transmitting circuit Z2 (Fig. 20). This common point is connected via resistor R147 to the positive pole of the voltage source. The common point of the relay cell by means of which the transmitting circuit Z1 is controlled is connected via the resistor R146 to the positive pole of the voltage source. For the other Z-circuits, the resistors R148 to R150 perform similar functions.

The series of relay cells of which rectifiers are connected to output terminals of the distributor 16VV consists of rectifiers G137 through G330 and resistors R116 through R145. Each of these relay cells is connected via one or more of its rectifiers to the common point of one or more relay cells which control a transmitting circuit Z1–5.

The other rectifiers are in general not all connected to points having negative potentials, so that in general the common points are positive. For a relay cell which controls a transmitting circuit Z1–5, consequently, all the rectifiers are in general connected to points having positive potentials, so that the common point of such a relay cell will in general be positive too and, consequently, also the input terminal 7 of the relevant transmitting circuit Z1–5. So in general the transmitting circuits will be in the + state. Through the operation of the distributor 16VV certain transmitting circuits must successively be given the opportunity to assume the — state, to wit those the serial number of which corresponds to the serial number of a blackened circle in Fig. 9. The fact is that in order that a — polarity element can be transmitted, the relevant transmitting circuit must be in the — state. This will occur as soon as one of the rectifiers of the relay cell which controls such a transmitting circuit is connected to — level, since in that case the common point of the relay cell and, consequently, the input terminal of the transmitting circuit will become negative. To obtain this, consequently, the common point of one of the relay cells to which the first-mentioned relay cell is connected must be negative.

Consequently, of one of these relay cells all the remaining rectifiers must be supplied with a negative potential.

As has been said already, the first negative pulse from the auxiliary circuit H7VV after the measuring set has been put in the transmitting condition will not influence the distributor 16VV. The latter circuit, consequently, remains in its initial state, all the transmitting circuits being in the + state. Consequently, the signal "letters" is in the transmitting circuits and will be transmitted, which will be described later. At the next pulse the distributor 16VV passes to state 2. We saw already from Fig. 9 that the signal "carriage return" (cr) is to be transmitted next, so the transmitting circuits Z1, Z2, Z3 and Z5 must be put in the — state. In the state 2 of the distributor 16VV all the rectifiers G137 through G140 of the most left-hand relay cell Fig. 17 are connected to + level, the common point being negative, consequently, and via G141 input terminals of the transmitting circuit Z2 will become negative too. Now the transmitting circuits Z1, Z3 and Z5 must still be put in the — state. Of the second relay cell from the left the rectifier G142 is connected to terminal r''3, the rectifier G143, to terminal r'''5 and the rectifier G144 to terminal r'''6 of the distributor 16VV. As can be seen at the top of Fig. 10 these rectifiers are thus at — level, in state 2 as well as in state 3 of the distributor 16VV. Consequently, in both states the input terminal of the transmitting circuit Z1 will be rendered negative via the rectifier G145, the input terminal of the transmitting circuit Z3 via the rectifier G146 and the input terminal of the transmitting circuit Z5 via the rectifier G147, so for state 2 the correct signal is stored in the transmitting circuit Z1–5. For state 3, as can be seen from Fig. 9, the transmitting circuits Z1, Z3, Z4 and Z5 must be in the — state. We saw already how for this state, the transmitting circuits Z1, Z3 and Z5 are put in the — state. Of the fourth relay cell from the left the rectifier G153 is connected to the terminal r''3, the rectifier G154 to the terminal r''4 the rectifier G155 to the terminal r'''5. As can be seen at the top of Fig. 10 for state 3 of the distributor 16VV (and also for state 15), these rectifiers are connected to — level in consequence. So in both states the input terminal of the transmitting circuit Z4 will become negative via the rectifier G157. As in the state 15, the transmitting circuit Z1 must be in the negative state too (Fig. 9) an additional connection has been made via the rectifier G156 to the input terminal of the transmitting circuit Z1. For state 3 this connection would not be necessary, because in that case the transmitting circuit Z1 is put in the — state in another way, but the connection does no harm.

In state 4 the signal "letters" (Fig. 9) is to be transmitted, so this state requires no special measures. Figs. 10 and 11 further illustrate the method. In the first column of Fig. 10 ("states") one or more states of the distributor 16VV are indicated below each other. In Figs. 17, 21 and 25 this same series of states is indicated from left to right between the top horizontal lines or rails of the distributor 16VV. Each of these indications is associated with a relay cell to show that the rectifiers of the various relay cells are connected to negative output terminals of the distributor 16VV in the states indicated. In the next 2 columns in Fig. 10 (4VVA, 4VVB) these output terminals are indicated for the distributor 4VVA and for the distributor 4VVB, respectively. The next column (V4 or V9) shows to which output terminal of the marking circuit V, a relay cell is connected too, since in the transmission a discrimination must be made between the cases in which circuit V is not (transmission of name) and those in which it is changed over (transmission of distortion figures). In the four described states of the distributor 16VV no connection of the relay cells used to the marking circuit V were necessary, since in these cases the signals to be transmitted for the name or for the distortion figures are still identical. As soon as these signals differ, however, a connection with a terminal of the marking circuit V will be necessary. When the name is being transmitted, the marking circuit V is not changed over; a rectifier of a relay cell, the common point of which is required to be negative, must then be connected to output terminal 4 of the marking circuit V (Fig. 19), because this terminal is negative then. In Fig. 10 this is indicated by V4. When the distortion figures are to be transmitted, the common point of the relevant relay cell will not become negative. When the distortion figures are being transmitted, the marking circuit V is changed over. A rectifier of another relay cell, the common point of which is then required to be negative must therefore be connected to output terminal 9 of the marking circuit V, because this terminal is negative now. In Fig. 10 this is indicated by V9. In this latter case for some states of the distributor 16VV a different signal must be transmitted, depending upon the amount of distortion measured. A relay cell must therefore also be connected in these states to output terminals of one or more distortion measuring circuits D5–D25. This is indicated in detail in the column "D5–25." In the column "Z1–5" it is further shown which transmitting circuits can be put in the — state by the relevant relay cell. The last column (No) gives an increasing series of figures which is used in Fig. 11 and which can also be regarded as the numeration of the thirty relay cells from left to right Figs. 17, 21 and 25 together.

VI–3b. Function of the Control Unit

In Fig. 11 the elements of negative polarity to be transmitted in the sixteen states of the distributor 16VV for the various cases are indicated by dots. At the top are shown the special elements for the signal "Who?," below these are shown the elements that signals "Who?" and "?" have in common, then the signal elements that are the same for the various amounts of distortion and finally the special elements for 0–5%, 5–10%, etc. For each negative polarity element it is also indicated by number (No.) through which relay cell the relevant transmitting circuit assumes the — state. With the aid of Figs. 10 and 11 the working of the control unit BO can easily be ascertained. One example may still be useful, after those already dealt with concerning the signals 1, 2, 3 and 4. We therefore choose in the column "states":

7, 7, 7 and 7–11, corresponding to numbers (No.) 13, 14, 15 and 16 in the last column. The corresponding relay cell must ensure the transmission of the 7th signal in case distortion figures are asked. The relay cell corresponding to No. 16, to begin with, has no connection to the marking circuit V or the distortion measuring circuits D, so that it evidently ensures the change-over to the — state of the transmitting circuits that must be in the — state in the case of "MW" ("Who?") and in all the cases of "?." As can be seen from Fig. 9, these are transmitting circuits Z1 and Z4. For this purpose the relevant relay cell is connected via rectifiers G229 through G231 (Fig. 21), respectively, to the output terminals *r''*3, *r''*4 and *r'''*7 of the distributor 16VV. At the top of Fig. 10 it can be seen that in states 7 and 11 of the distributor 16VV the common point of the relay cell will become negative. The transmitting circuit Z1 will be put in the — state via the rectifiers G232 and the transmitting circuit Z4 via rectifier G233. This change-over to the — state of the transmitting circuits Z1 and Z4 is also indicated in Fig. 10, and in the part marked "MW and ?" in Fig. 11, the relevant elements are indicated by the dots "16." If the distortion amounts to 0–5%, 10 to 15% or 20 to 25% the change-over of the transmitting circuits Z1 and Z4 would be sufficient. If, however, the distortion amounts to 5 to 10%, 15 to 20% or 25 to 50%, the transmitting circuits Z2 and Z3 must be put in the — state as well, as results from Fig. 9. Relay cell No. 15 has been provided for the transmission of 5–10%. Via rectifiers G220 through G223 (Fig. 21) this relay cell No. 15 is connected to the output terminals of *r''*3, *r''*4, *r'''*6 and *r'''*7 of the distributor 16VV, respectively. At the top of Fig. 10 it can be seen that in this case the common point of the relay cell is only given an opportunity to become negative in state 7 of the distributor 16VV. Whether it will become negative indeed depends on the voltages applied to the other rectifiers. Of these rectifiers, the rectifier G228 is connected to output terminal 9 of the marking circuit V. So only if "?" is received, the rectifier G228 will be at — level. Further the rectifier G227 is connected to output terminal 9 of the distortion measuring circuit D5, so only if the distortion is larger than 5%, the rectifier G227 will be at — level. In the case of a distortion of 10–15% or 20–25%, however, the common point of this relay cell must not become negative. Therefore this point is still connected via the rectifier G226 to output terminal 4 of the distortion measuring circuit D10. The rectifier G226 will only be at — level in the case of a distortion of less than 10%. It has been obtained, consequently, that the common point is only negative in the case of a distortion of 5–10%. In this case the transmitting circuit Z2 is put in the — state via the rectifier G224 and the transmitting circuit Z3 via the rectifier G225. In Figs. 10 and 11 these things are also shown. In Fig. 11 the elements 2 and 3 are indicated by 15 in the table marked D5.

Also in the case of a distortion of 15 to 20% the transmitting circuits Z2 and Z3 must be put in the — state. This is done through the relay cell No. 14. This relay cell is also connected, in this case, via rectifiers G211 to G214 to the terminals *r''*3, *r''*4, *r'''*6 and *r'''*7. There is also a connection to output terminal 9 of the marking circuit V, this time via the rectifier G219. Further the rectifier G218 is connected to output terminal 9 of the distortion measuring circuit D15 and the rectifier G217 to output terminal 4 of the distortion measuring circuit D20. Thus it is obtained that the common point only becomes negative in state 7 of the distributor 16VV, if distortion figures are asked and if the distortion is between 15 and 20%. In Fig. 11 the elements 2 and 3 are indicated by 14 in the state marked D15. Finally in the case of a distortion of 25–50%, the transmitting circuits Z2 and Z3 must be put in the — state. This is done by means of the relay cell No. 13. In this relay cell too, the connections are provided to the terminals *r''*3, *r''*4, *r'''*6 and *r'''*7, this time via rectifiers G203 to G206. The rectifier G210 is connected to output terminal 9 of the marking circuit V and the rectifier G209 to output terminal 9 of the distortion measuring circuit D25. Thus it is obtained that the common point only becomes negative in state 7 of the distributor cancel "id" 16VV, of the amount if distortion is asked and if this exceeds 25%. In Fig. 11 the elements 2 and 3 are indicated by 13 in the table marked D25.

After the treatment of these examples it is supposed that the method for the control of the transmitting circuits has been elucidated sufficiently. In the given embodiment attention has been paid to the question whether different states of the distributor 16VV have an element of — polarity in common, so that it may be obtained by means of one and the same relay cell. It is possible that thus in a certain case a transmitting circuit is put in the — state in two ways, but of course this does not matter. An example thereof was already found with the first element in state 3, where the transmitting circuit Z1 is put in the — state by means of relay cell 2 as well as by means of relay cell 4. Another example is the fourth element in state 7, where the transmitting circuit Z4 is put in the — state by means of relay cell 16 in all cases of distortion, but also by means of relay cell 12 in the cases of distortion figures of over 10%.

The signals 9, 12, 13 and 14 of the table MW (see Fig. 9), however, have been kept outside this collective treatment, in order that the name of the measuring set can easily be changed.

It will be obvious that changes are possible in the combination of the elements the transmitting circuits corresponding to which are rendered negative through one and the same relay cell. The total number of 30 relay cells may thus be changed.

After it has thus been considered how at each step of the distributor 16VV the transmitting circuits are put in states corresponding to the polarities of the intelligence elements of the signal to be transmitted at this step, the transmission itself will be described.

VII. *Transmitting circuits Z1–5, OZT*

For this purpose the states of the transmitting circuits Z1 to Z5 (Fig. 20) must be successively taken over by a circuit OZT (Fig. 19), from which they control the output circuit U and the control output circuit CU (Fig. 23). For circuit OZT use can be made again of the standard circuit according to Fig. 3. In order to enable the output terminal 4 of each transmitting circuit for Z1–5 to impart for 20 milliseconds its positive or negative potential to the input terminal 7 of circuit OZT, relay cells are used again, of which in this case rectifiers are connected to output terminals *rv* of the distributor 7VV. Besides a possibility has been opened for the circuit OZT to take over successively, in the receiving condition of the measuring set, the states of the receiving circuits O (Fig. 12), from which then the control output circuit CU is controlled.

For this purpose the output terminal 4 of each Z-circuit is connected via a rectifier to the common point of a separate relay cell, this common point being connected via a resistor (R152—R157) with a point of positive potential, via two rectifiers (G346—G357) to two output terminals of the distributor 7VV (so that by means of the simultaneous positive condition of these terminals a special state of the distributor is marked), via a rectifier (G335—G339) to output terminal 4 of the corresponding receiver circuit O and via a rectifier (G340—G345) to input terminal 7 of the circuit OZT. This input terminal 7 of circuit OZT is connected on the other hand via a rectifier G358 to the output terminal 4 of the time scale controlling circuit SC (Fig. 14). When no control of the time scale is carried out, this terminal 4 is negative.

Besides, input terminal 7 of the circuit OZT is supplied via resistor R151 with a negative potential. Thus output terminal 4 of the transmitting circuit Z1 is connected via the rectifier G330′ to the common point of a relay cell, this common point being connected via the resistor R152 to a point of positive potential, via the rectifier G346 to output terminal $r^v2$ and via the rectifier G347 to output terminal $r^v7$ of the distributor 7VV (Fig. 15), via the rectifier G335 to output terminal 4 of the receiving circuit O1 and via the rectifier G340 to input terminal 7 of the circuit OZT. For the other transmitting circuits the relay cells are composed in a similar way of resistors R153 to R156 and of rectifiers G331 to G334, G348 to G355, G336 to G339 and G341 to G344. Besides, a sixth relay cell has been provided, the common point of which is not connected to the output terminals of a transmitting circuit Z and a receiving circuit O, but only via resistor R157 to a point of positive potential, via rectifier G357 to output terminal $r^v5$ and via rectifier G356 to output terminal $r^v7$ of the distributor 7VV and via rectifier G345 to input terminal 7 of the circuit OZT. This relay cell is used for the transmission of the "stop" element. The relay cell proper which controls the circuit OZT is formed by G340 to G345, G358 and the resistor R151. During the transmission all the receiving circuits O are in the + state, as has been stated earlier already. The relay cell associated with the transmitting circuit Z1 is connected to terminals $r^v2$ and $r^v7$ of the distributor 7VV, as has already been observed, the relay cell associated with the transmitting circuit Z2 is connected to the terminals $r^v1$ and $r^v3$, the relay cell associated with the transmitting circuit Z3 to the terminals $r^v2$ and $r^v4$, the relay cell associated with the transmitting circuit Z4 is connected to the terminals $r^v3$ and $r^v5$, the relay cell associated with the transmitting circuit Z5 is connected to the terminals $r^v4$ and $r^v6$, and the sixth relay cell to the terminals $r^v5$ and $r^v7$. The transmission of a signal begins, as soon as the distributor 7VV makes its first step. It can easily be ascertained with the aid of the table given in 7VV (Fig. 15) that in the second state of the distributor 7VV occurring then, none of the said relay cells is connected to two positive output terminals of the distributor 7VV. Consequently, the common points of all these relay cells will be positive, so input terminal 7 of the circuit OZT will be positive too. For the duration of the 2nd state of the distributor 7VV, i.e. for 20 milliseconds, this will be the case (transmission of a "start" element). When the distributor 7VV assumes the 3rd state, the relay cell associated with the transmitting circuit Z1, and only this relay cell, will be connected to two positive output terminals of the distributor 7VV. The common point of this relay cell will be positive, if output terminal 4 of the transmitting circuit Z1 is positive too. If this terminal is negative, the said common point will be negative too. As all the other common points are negative, input terminal 7 of the circuit OZT will only become positive in the former case, notably via G340. In the latter case it will remain negative. So during state 3 of the distributor 7VV, the circuit OZT is in the same state as the transmitting circuit Z1. In like manner during state 4 of the distributor 7VV, the circuit OZT is in the same state as the transmitting circuit Z2, and this goes on up to and including state 7 of the distributor 7VV, in which the circuit OZT is in the same state as the transmitting circuit Z5. After having been in state 7 for 20 milliseconds, the distributor 7VV returns to state 1. In this case the 6th relay cell is connected to the two positive output terminals of the distributor 7VV, its common point is positive then and via the rectifier G345 input terminal 7 of the circuit OZT is rendered positive (transmission of a "stop" element). The duration of the "stop" element can be adjusted by means of resistor R21 (Fig. 15), as was discussed earlier.

In the described manner the circuit OZT successively takes over the states of the transmitting circuits Z1 to Z5, which render the polarities of the intelligence elements of the signal to be transmitted, and adds, at the beginning and at the end of this series of the intelligence elements, the states corresponding to the "start" and the "stop" element.

VIII. *Output circuits, U, CU*

It will be described now how the input terminals of the output circuit U and the control output circuit CU take over the potentials appearing at output terminal 4 of the circuit OZT.

Figure 8:
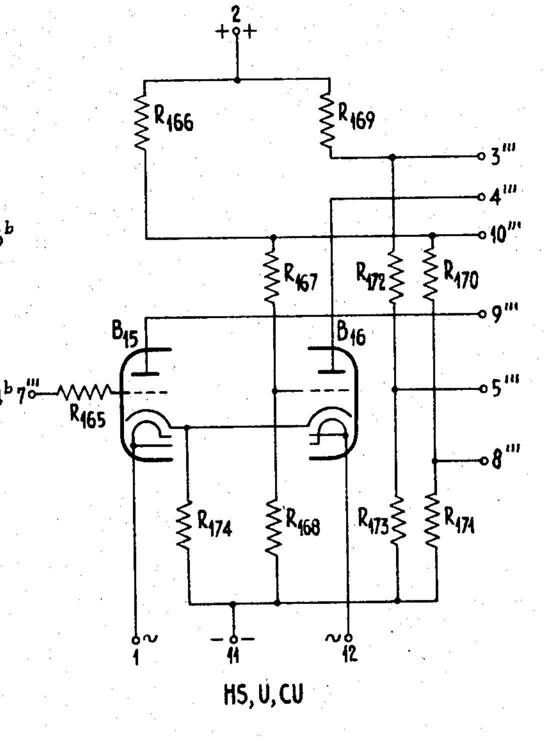
Fig. 8 is a wiring diagram of the circuit used for the parts HS, U and CU shown in Figs. 22 and 23.

The circuits U and CU have relay windings ZR and VR, respectively, in the anode circuits of their tubes. The circuits of U and CU are shown in detail in Fig. 8. As can be seen input terminal 7‴ is connected via a resistor R165 to the control grid of a tube B15. The anode of this tube is connected to output terminal 9‴. The positive pole of the voltage source (terminal 2) is connected via a resistor R166 to output terminal 10‴. Between terminals 9‴ and 10‴ a relay winding can then be connected. Between terminal 10‴ and the negative pole of the voltage source (terminal 11), a potentiometer has been provided, designated by resistors R167/R168, the tapping point of which is connected to the control grid of the second tube B16 of this circuit. The anode of this tube B16 is connected to output terminal 4‴. The positive pole of the voltage source (terminal 2) is connected via a resistor R169 to output terminal 3‴. Thus between terminals 3‴ and 4‴ a relay winding can also be inserted. Finally, a potentiometer R170/R171 has been provided between terminals 10‴ and 11, the tapping point of which is connected to output terminal 8‴ and a potentiometer R172/R173 between terminals 3‴ and 11, the tapping point of which is connected to output terminal 5‴. The filament voltage is supplied again between terminals 1 and 12, the cathodes of tubes B15 and B16 being connected via resistor R174 to the negative pole of the voltage source. So properly speaking the circuit, according to Fig. 8, is a circuit according to Fig. 3 with the modifications that are necessary in view of the insertion of relay windings in their tube anode circuits.

The control of the output circuit U (Fig. 23) will now be considered first. Output terminal 4 of the circuit OZT is connected via rectifier G359 to the common point N of a relay cell, which is connected via resistor R160 to a point of negative potential, via rectifier G360 to output terminal 9 of the marking circuit MV (Fig. 19) and via rectifier G361 to input terminal 7‴ of the output circuit U. As the measuring set is in the transmitting condition, output terminal 9 of the marking circuit MV will be negative. If output terminal 4 of the circuit OZT is negative too, the common point N will be negative. If the latter terminal is positive, the common point N will be positive too. Input terminal 7‴ of the output circuit U is connected not only to the rectifier G361, but also via resistor R158 to a point of positive polarity, via rectifier G362 to a point M, via rectifier G368 to output terminal 9 of an auxiliary delayed stop circuit HSV (Fig. 22), and via rectifier G365 to point L.

VIII–1. SET TRANSMITTER-RECORDER ZV*e*, OV*e*

Contacts ZV*e* represents the transmitting contacts of the transmitting device of a teleprinter associated with the measuring set. The receiving device of this teleprinter with the receiving coil OV*e* is separated from the transmitting device. In the normal condition shown of the contacts ZV*e* point M is positive. As will be seen in what follows, output terminal 9 of the auxiliary delayed stop circuit HSV is positive too. Point L is again the common point of a relay cell, which is connected via resistor R159 to a point of negative polarity, via rectifier G364 to output terminal 8‴ of an auxiliary stop circuit HS (Fig. 22) and via rectifier G363 to output terminal 4 of the time scale controlling circuit SC (Fig. 14). Output terminal 8‴ of the auxiliary stop circuit HS is positive, as will be seen later. Consequently, point L will be positive too (output terminal 4 of the time scale controlling circuit SC is negative, because no control of the time scale is carried out). If point N is positive, input terminal 7''' of the output circuit U will be positive too. If, however, point N is negative, the said input terminal will be negative as well. In the former case the windings of the polarized relay ZR that are inserted in the anode circuits are so energized that contact *zr* is at +60 v.; in the latter case the energization is exactly the opposite and contact *zr* will be at −60 v. (see Fig. 23 at the right), so the signal is transmitted in the usual way.

Output terminal 4 of the circuit OZT is further connected via rectifier G366 to input terminal 7''' of the control output circuit CU. This input terminal is also connected via resistor R164 to a point of positive potential and via rectifier G367 to point M. As has been observed already, point M is positive. So if output terminal 4 of the circuit OZT is positive, input terminal 7''' of the control output circuit CU will be positive too. If the said output terminal is negative, input terminal 7''' will be negative too. In the anode circuits of the tubes of the control output circuit CU, windings of a polarized relay VR have been inserted; contact *vr* of this relay is located in the energizing circuit for the receiving coil OV*e* of the teleprinter associated with the measuring set. The magnet OV*e* of the receiving device is now energized or not. Consequently, the signal transmitted is also printed by the teleprinter associated with the measuring set.

As has been observed already, in the receiving condition of the measuring set, the signals received can also control the control output circuit CU and thus be printed by the teleprinter associated with the measuring set, which will be considered now. When the circuit OZT was to take over the states of the transmitting circuits, the receiving circuits were all in the + state. Conversely, if the circuit OZT must take over the states of the receiving circuits, the transmitting circuits are all in the + state, since this is their normal state, as has been described. As input terminal 7 of the circuit OZT successively took over the potentials appearing at output terminals 4 of the transmitting circuits Z1 to Z5, thus is will now take over the potentials of the output terminals 4 of the receiving circuits O1 to O5. The transmission to the control output circuit CU will start again as soon as the distributor 7VV makes its first step, i.e. in the middle of the reception of the "start" element (see Fig. 2). Input terminal 7 of the circuit OZT becomes negative now (transmission of "start" element). As soon as the distributor 7VV makes its second step, i.e. in the middle of the reception of the first intelligence element, input terminal 7 of the circuit OZT takes over the potential of output terminal 4 of the receiving circuit O1. Thus all the intelligence elements of the received signal are passed by means of positive or negative voltages to input terminal 7 of the circuit OZT, immediately after their polarities have been scanned in the scanning devices. When, ten milliseconds after the theoretical commencement of the "stop" element, the distributor 7VV returns to state 1, the transmission of the "stop" element is effected by means of the sixth relay cell, as has been described earlier.

The duration of this "stop" element will be equal to that of the received "stop" element. In a manner as described for the transmitting condition, the input terminal 7''' of the control output circuit CU will take over the potential of output terminal 4 of the circuit OZT and then the received signal will be printed in the receiving device of the teleprinter associated with the measuring set. Input terminal 7''' of the output circuit U, however, will not be able to take over the potential of output terminal 4 of the circuit OZT in this case, since in the receiving condition, output terminal 9 of the marking circuit MV is positive, so point N will constantly be positive via the rectifier G360, irrespective of the voltage appearing at output terminal 4 of the circuit OZT. Input terminal 7''' of the output circuit U is only connected to points having positive potentials, and, consequently, will be positive itself. The measuring set delivers a positive voltage to the outgoing line. Thus it has been avoided that a received signal is retransmitted.

For somebody present at the measuring set there is an opportunity, however, to send a message to the calling subscriber. This might be desirable e.g. if the subscriber proves to be not sufficiently familiar with the use of the measuring set. If the transmitting device of the teleprinter associated with the measuring set is used at a moment when no signals are transmitted or received by the measuring set itself, output terminal 4 of the circuit OZT will be positive, as well as point N. In that case point M, according as the transmitting contact ZV*e* is closed or open, will have a positive or a negative potential. The fact is that the point M is connected to the tap on the potentiometer formed by resistors R161, R162 and R163, the end of the resistor R161 being connected to a point of positive voltage and the end of the resistor R163 to a point of negative voltage, the resistor R162 being short-circuited or not during the transmission by operation of the sending contacts ZV*e*. As input terminal 7''' of the output circuit U, as well as input terminal 7''' of the control output circuit CU are further only connected to points of positive voltage, these input terminals will take over the potential of the point M. Thus signals may be transmitted and at the same time recorded by the receiving device OV*e* of the teleprinter at the measuring set.

IX. *Specific control circuits*

IX-1. CALLING AND FALSE REST CONDITION CIRCUITS OS, S, HS

Now the calling and clearing signalling will be described as it is effected in a measuring set connected to an automatic telegraph exchange. In the false rest condition, the armature *or* (Fig. 12) will be in the position shown and the measuring set will have to deliver a negative voltage at the contact *zr* (Fig. 23). This is obtained as follows. Via the rectifier G2 input terminal 7 of the input circuit IN is connected to output terminal 9 of the receiving circuit OS (Fig. 18) and this latter terminal is positive in the false rest condition, as will be explained in the description of the clearing signalling. Consequently, input terminal 7 of the input circuit IN will be positive too, and the measuring set is at normal. The receiving circuit OS (Fig. 18) may be a standard circuit according to Fig. 3 again, changed into a memory circuit by means of a connection of output terminal 5 to input terminal 7. Its output terminal 9 is connected to input terminal 7''' of a stop circuit S (Fig. 22), so this latter terminal will be positive too. The stop circuit S is a circuit according to Fig. 4. The anode of the second tube B12 of circuit S is connected via a parallel connection of resistor R170 and capacitor C33 to the positive pole of the voltage source. Between this anode and the negative pole of the voltage source, there is a potentiometer R171/R172, of which the tapping point W is connected to input terminal 7''' of the auxiliary stop circuit HS. If as a result of a decrease of the potential of input terminal 7' of the stop circuit S, the first tube B11 of this circuit becomes non-conductive, and the second tube B12 becomes conductive, the potential of the point W will rapidly decrease, because C33 the capacitor is rapidly charged. In the contrary case the potential of the point W will slowly increase, because the capacitor C33 is slowly discharged and the auxiliary stop circuit HS is a circuit according to Fig. 8, one anode circuit (of tube B16) of which contains, between terminals 3''' and 4''', the windings of the teleprinter motor relay MR; the terminals 9''' and 10''' of the other anode circuit (of tube B15) being connected together. As input terminal 7' of the stop circuit S is positive, the second tube B12 in this circuit will be non-conductive. The resistors R170 to R172 are so chosen that input terminal 7''' of the auxiliary stop circuit HS is positive then. Output terminal 8''' of the auxiliary stop circuit HS will be negative then. Consequently, point L (Fig. 23) will be supplied via the rectifier G364 as well as via the rectifier G363 (no control of the time scale) with a negative voltage and is therefore negative. Via G365 input terminal 7''' of the output circuit U will be supplied with a negative voltage and the measuring set delivers a negative voltage to the outgoing line.

Figure 18:
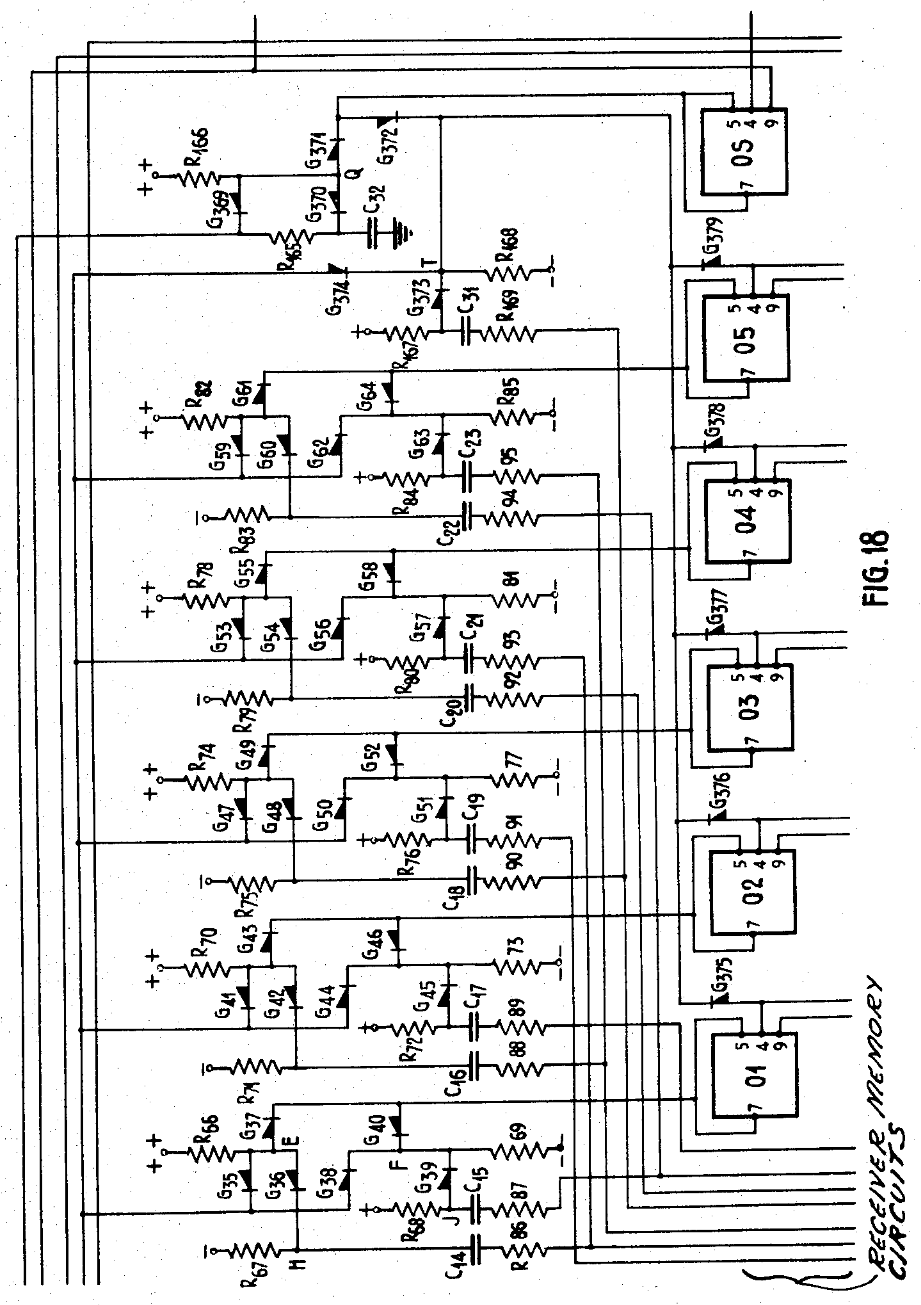

If next a call for the measuring set arrives, armature *or* (Fig. 12) is changed over. The motor of the teleprinter of the measuring set will have to start and the measuring set will have to deliver a positive voltage at the contact *zr*. This is obtained as follows: Point A in the input circuit (Fig. 12) is positive and this point is connected to the connecting point of a resistor R165 and a rectifier G369 (Fig. 18). Resistor R165 is connected to ground via a capacitor C32. The connecting point of the resistor R165 and the capacitor C32 is connected via rectifier G370 to the common point Q of a relay cell, and the rectifier G369 is connected to it too. The common point Q is further connected via resistor R166 to the positive pole of the voltage source and via rectifier G371 to input terminal 7 of the receiving circuit OS. This terminal is connected via rectifier G372 to the common point T of a second relay cell. The common point T is connected via resistor R168 to the negative pole of the voltage source, via rectifiers G375 to G379 to output terminals 4 of the receiving circuits O1 to O5, via rectifier G374 to output terminal 4 of the input circuit IN (Fig. 12), and via rectifier G373 to the connecting point of a capacitor C31 and a resistor R167. Resistor R167 is connected on the other hand to a point of positive polarity, capacitor C31 being connected on the other hand via a resistor R169 to output terminal $a^{v}$4 of the distributor 7VV (Fig. 15). Because point A (Fig. 12) is positive, the connecting point of R165 and G369 is positive too. After some time the connecting point of R165 and G370 will also be positive. The capacitor C32, which causes this delay, has been provided to prevent a false call from putting the receiving circuit OS in the + state, which would cause the motor of the teleprinter to start. If once the rectifiers G369 and G370 are provided with a positive potential, the point Q will also be positive and via the rectifier G371 input terminal 7 of the receiving circuit OS will become positive. Point T is provided with a positive potential via rectifier G373, so rectifier G372 is in the blocking condition. Now that the receiving circuit OS has assumed the + state, input terminal 7 of the input circuit IN is no longer kept positive via the rectifier G2. This is not done via the rectifier G3 either, since output terminal 4 of the marking circuit MV (Fig. 19) is negative in the receiving condition, so the potential of point A determines the potential of terminal 7 of the input circuit IN. If a start element arrives, the measuring set will become operative. Before it is so far, however, the change-over of the receiving circuit OS to the + state has already had some consequences. Output terminal 9 of the receiving circuit OS has become negative, and, consequently, also input terminal 7' of the stop circuit S. The second tube B12 of the stop circuit S becomes conductive now, capacitor C33 is quickly charged and input terminal 7''' of the auxiliary stop circuit HS becomes negative, if the values of resistors R170 to R172 have been correctly chosen. The second tube B16 of the auxiliary stop circuit HS becomes conductive in consequence and the windings of the motor relay MR are energized. Contacts $mr^1$ and $mr^2$ of this relay close the circuit for the teleprinter motor. Contact $mr^3$ closes a circuit for a neon indicator tube, which thus signals the busy state of the measuring set (see Fig. 22 at the right).

IX–2. SET ANSWERING CIRCUITS (HSV, SV)

Because the receiving circuit OS has assumed the + state, a positive voltage is delivered at the contact *zr*. As has been described already, input terminal 7''' of the auxiliary stop circuit HS becomes negative as a result of this. Consequently, output terminal 8''' of the auxiliary stop circuit HS becomes positive, as well as point L (Fig. 23). Via the rectifier G365 input terminal 7''' of the output circuit U is supplied with a positive potential. But this will also be the case via the other rectifiers. The transmitting contact ZV*e* is in the rest condition, so via the rectifier G362 the positive point M is reached. The circuit OZT (Fig. 19) is still at normal, so output terminal 4 is positive and via the rectifier G359 also point N. So input terminal 7''' of the output circuit U is connected via the rectifier G361 to a point of positive potential. Now the potential of output terminal 9 of the auxiliary delayed stop circuit HSV must still be ascertained. This terminal is reached via the rectifier G368. As the receiving circuit OS is in the + state, its output terminal 4 is positive. So input terminal 7' of the delayed stop circuit SV (Fig. 22) is supplied via rectifier G380 with a positive potential. The delayed stop circuit SV is a circuit similar to the stop circuit S, except that the time of discharge of the capacitor (C34) is longer. Input terminal 7' of the delayed stop circuit SV is connected via rectifier G381 to output terminal 9 of the auxiliary circuit H7VV (Fig. 15). In the normal condition this terminal is positive too. Input terminal 7' of SV is connected via the delayed stop circuit rectifier G382 to output terminal 5''' of the control output circuit CU (Fig. 23). Input terminal 7''' of the control output circuit CU is positive, so also is output terminal 5'''. As input terminal 7 of SV is connected via these three rectifiers to a point of positive potential and via resistor R174 to the positive pole of the voltage source, then this terminal 7' of delayed stop circuit SV will be positive. The anode of the second tube B12 of the delayed stop circuit SV is connected via a resistor R175, to which a capacitor C34 is connected in parallel, to the positive pole of the voltage source. This anode is also connected via a potentiometer R176/R177 to the negative pole of the voltage source. The tap Z on this potentiometer is connected to input terminal 8 of the auxiliary delayed stop circuit HSV. This circuit may again be a standard circuit according to Fig. 3. As soon as input terminal 7' of the delayed stop circuit SV becomes positive, the first tube of this circuit becomes conductive, the second non-conductive. The time of discharge of the capacitor C34 is so large, however, that only after 20 seconds, the point Z, and, consequently, input terminal 8 of the auxiliary delayed stop circuit HSV, becomes positive. So for 20 seconds, the output terminal 9 of the auxiliary delayed stop circuit HSV remains positive and also via the rectifier G368 input terminal 7''' of the output circuit U is supplied with a positive potential. A positive voltage is delivered at the contact *zr*. This is the answering criterion of the measuring set for the automatic telegraph exchange.

IX–3. CLEARING SIGNAL AND SET STOPPING CIRCUITS

If + polarity is received for 20 seconds at the input terminal of the measuring set, i.e. if a call is initiated, but if no transmission takes place for 20 seconds, no transmission being effected by the measuring set either, so that input terminal 7' of the delayed stop circuit SV remains positive, input terminal 7''' of the output circuit U will be rendered negative via the rectifier G368 with the aid of delayed stop circuit SV and the auxiliary delayed stop circuit HSV. The measuring set delivers at the contact *zr* to the outgoing line a negative voltage as a clearing criterion and is thus available again for a next call. If signals are being received or transmitted by the measuring set, this cannot happen, because every time in that case output terminal 9 of the auxiliary circuit H7VV becomes negative for 120 milliseconds, so that every time via the rectifier G381 input terminal of the delayed stop circuit SV becomes negative and capacitor C34 gets no opportunity to discharge sufficiently.

If a person attending the measuring set sends signals, i.e. if the transmitting contact ZV*e* is put in operation, this cannot happen either, because every time output terminal 5‴ of the control output circuit CU will become negative, and, consequently, via the rectifier G382 also input terminal 7′ of the delayed stop circuit SV giving no opportunity for capacitor C34 to discharge sufficiently.

If after the call signals are received, the receiving circuit OS remains in the + state, which is necessary because otherwise the teleprinter motor would stop; the receiving circuit OS does not return to the − state until − polarity is received for some time for the clearing signalling. Point Q (Fig. 18) will then become negative and the rectifier G371 is in the blocking condition.

Point T now becomes negative too, because the receiving circuits O1 to O5 are all in the − state, the point T being supplied via rectifiers G375 to G379 with a negative potential. Output terminal 4 of the input circuit IN is negative, so the point T is also provided with a negative potential via the rectifier G374. At the moment when the distributor 7VV restores to normal, a negative pulse will appear at its output terminal $a^{v}$4 via the resistor R169 and the capacitor C31. So also via the rectifier G373 the point T is for a moment supplied with a negative potential and becomes negative for a moment. Via the rectifier G372 input terminal 7 of the receiving circuit OS will be rendered negative for a moment, so that the receiving circuit OS will assume the − state. As the receiving circuit OS is a memory circuit, it will remain in the − state after the negative pulse. The negative pulse also occurs one time during the operation of the measuring set at each cycle of the distributor 7VV, it is true, but because at that moment the stop element is just received (in the receiving condition) or because output terminal 4 of the input circuit IN is constantly positive (in the transmitting condition) point T will nevertheless be positive via the rectifier G374.

So only on reception of the clearing signal, the receiving circuit OS assumes the − state. It has been described earlier already that this causes the measuring set to deliver a negative voltage to the outgoing line. This must not happen immediately, however, because in a certain type of automatic telegraph exchange e.g. a delay of at least 600 milliseconds is required. The stop circuit S and the auxiliary stop circuit HS ensure this delay. Input terminal 7′ of the stop circuit S does immediately become positive indeed, so that the second tube B12 of this circuit immediately becomes non-conductive, but the discharging time of the capacitor C33 is so large that only after 600 milliseconds point W becomes positive, so also input terminal 7‴ of the auxiliary stop circuit HS. The teleprinter motor will stop and a negative voltage is delivered to the outgoing line. As soon as the receiving circuit OS assumes the − state, input terminal 7 of the input circuit IN becomes positive, as has been described already, via the positive output terminal 9 of the receiving circuits OS and O2: the measuring device stops. As a result of this, the circuit OZT assumes the + state and this causes the control output circuit CU to assume the + state: after in the case of clearing signalling − polarity has been received for 130 milliseconds, the receiving device of the teleprinter is duly switched off. It will be clear that by such provisions the measuring set can easily be adapted to contingent different requirements of another type of automatic telegraph exchange.

While I have illustrated and described what I regard to be the preferred embodiment of my invention, nevertheless it will be understood that such is merely exemplary and that numerous modifications and rearrangements may be made therein without departing from the essence of the invention, I claim:

1. A teleprinter distortion measuring set comprising: a receiving circuit for receiving multi-element time spaced signals from teleprinters remote from said set, a time scale circuit started by a signal received at said receiving circuit, a distortion measuring circuit controlled by said time scale circuit for measuring distortion of successively received signals, a transmitting circuit for transmitting answering and the measured distortion indicating signals to a remote teleprinter, marking means in said receiving circuits to respond to a call from a remote teleprinter to transmit the distortion measured in its signals, means controlled by said marking means to answer said call through said transmitting circuit and to start said time scale circuit, additional marking means in said receiving circuit responsive to a request for the greatest distortion measured, and means controlled by said additional marking means to cause said transmitting circuit to transmit the measured distortion indication signal and to stop the measuring operations of said set.

2. A distortion measuring set for start-stop multi-element telegraph code signals and located at one of a plurality of stations in a network, said set comprising: an input circuit for receiving said signals, an impulse generator instigated by the first element of a received signal from said input circuit, a time scale means operated by impulses from said generator, a distortion measuring means connected to said input circuit and said time scale means, a signal scanning circuit also connected to said input circuit and said time scale means, a receiving means for each intelligence element of a received signal controlled by said scanning circuit, a marking circuit connected to said receiving means for detecting special signals received from a remote station requesting the amount of distortion in signals received from said remote station, and a transmitting means controlled by said marking circuit and said distortion measuring means for transmitting the requested information back to said remote station and resetting said set back into signal receiving condition.

3. A set according to claim 2 wherein said time scale means comprises a plurality of distributors.

4. A set according to claim 3 wherein said transmitting means includes a control circuit connected to said distortion measuring means to form signals corresponding to said requested information.

5. A set according to claim 4 wherein said transmitting means includes an output circuit for transmitting said formed information signals back to said requesting remote station.

6. A signal distortion measuring set for a telecommunication network having at least two stations remote from each other, said set being located at one station and having means for measuring the distortion of signals from the other station and signalling said other station the results of said measurements at the request of a signal from said other station, said means comprising: a receiving means including an input means, means for receiving the signals to be measured, and means responsive to said request signal; a time scale means connected to said input and said responsive means and started by each signal received from said input means from said other station, and for each signal to be transmitted to said other station by said responsive means after a request for such transmission has been received; a distortion measuring means connected to said input means and to said time scale means and controlled by said time scale means for measuring the distortion of said received signals to be measured; and a transmitting means connected to and controlled by said distortion measuring means, said time scale, and said receiving means, and including means for answering said request and signalling the results of said measurements.

7. A set according to claim 2 including a multi-vibrator pulse generator connected to said input means, and wherein said time scale means includes a plurality of distributors connected to and controlled by said pulse generator.

8. A set according to claim 6 wherein said transmitter means includes a control circuit for forming the signals to be transmitted by said set, said control circuit being connected to and controlled by said time scale means, said distortion measuring means, and said responsive means.

9. A set according to claim 8 wherein each signal is composed of a plurality of time divided signal elements, and said answering means in said transmitting means includes a plurality of separate intelligence element transmitting circuits connected to and controlled by said control circuit.

10. A set according to claim 6 wherein said transmitting means includes a teleprinter which includes means for transmitting signals from said set.

11. A set according to claim 1 wherein said marking means includes means responsive to a call from a remote teleprinter requesting identification of said set, and wherein said transmitting circuit includes means for transmitting such identifying signals in response to said identification requesting means.

12. A set according to claim 1 wherein said receiving circuit includes a teleprinter for recording the signals received and measured by said set.

13. A set according to claim 12 wherein said teleprinter includes means for recording the signals transmitted by said set and for transmitting other signals.

14. A set according to claim 4 wherein said transmitting means includes a plurality of separate intelligence element transferring circuits controlled by said control circuit.

15. A set according to claim 2 wherein said distortion measuring means includes a pulsing circuit connected to said receiving means for indicating the transition between elements of a signal.

16. A set according to claim 2 wherein said marking circuit includes means for detecting special signals received from a remote station requesting identification of said set, and wherein said transmitting means includes means for transmitting such request identifying signals.

17. A measuring set according to claim 2 including visual means and a standard frequency source, both connected to said time scale means, for checking the accuracy of said time scale means against said standard frequency source, and including manual means to adjust the operation of said impulse generator controlling said time scale means.

18. A set according to claim 2 wherein said distortion measuring means includes a plurality of memory circuits for measuring different fixed percentages of distortion of each element of each signal as it is received and remembering the maximum distortion received.

19. A set according to claim 2 including means for indicating when said set is busy measuring distortion from one remote station in said network.

20. A set according to claim 19 wherein said busy indicating means includes a memory circuit, the states of which correspond respectively to the absolute rest condition and the busy condition of said set, and said output circuit is connected to and controlled by said memory circuit which also is connected to help control the input circuit of said set.

21. A set according to claim 20 including two different delay control circuits connected in parallel to said memory circuit, which delay control circuits change their states with a small and a large delay, respectively, as a result of a change of state of said memory circuit due to the change-over of the set from the busy condition to the absolute rest condition and conversely, respectively, and without delay in the opposite cases.

References Cited in the file of this patent

UNITED STATES PATENTS

| | | |
|---|---|---|
| 1,845,994 | Wise | Feb. 16, 1932 |
| 1,920,454 | Weaver | Aug. 1, 1933 |
| 2,235,755 | Bakker | Mar. 18, 1941 |
| 2,242,196 | Thompson | May 13, 1941 |
| 2,281,745 | Buckingham | May 5, 1942 |
| 2,435,258 | Wilder | Feb. 3, 1948 |
| 2,509,829 | La Calvey | May 30, 1950 |
| 2,510,531 | Trevor | June 6, 1950 |